(12) United States Patent
Matsuura et al.

(10) Patent No.: US 9,126,542 B2
(45) Date of Patent: Sep. 8, 2015

(54) VEHICLE PROGRAM REWRITING SYSTEM

(75) Inventors: Masanori Matsuura, Utsunomiya (JP); Osamu Miyamoto, Utsunomiya (JP); Aiko Miyamoto, legal representative, Utsunomiya (JP); Kenichi Ishida, Sakura (JP); Kazuyoshi Wakita, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 13/813,415

(22) PCT Filed: May 13, 2011

(86) PCT No.: PCT/JP2011/061037
§ 371 (c)(1),
(2), (4) Date: Mar. 27, 2013

(87) PCT Pub. No.: WO2012/017719
PCT Pub. Date: Feb. 9, 2012

(65) Prior Publication Data
US 2013/0197712 A1 Aug. 1, 2013

(30) Foreign Application Priority Data
Aug. 3, 2010 (JP) ................................. 2010-174785

(51) Int. Cl.
*G11C 16/06* (2006.01)
*G11C 16/10* (2006.01)
*B60R 16/02* (2006.01)
*B60R 25/24* (2013.01)
*G06F 9/445* (2006.01)
(Continued)

(52) U.S. Cl.
CPC ................. *B60R 16/02* (2013.01); *B60R 25/24* (2013.01); *G06F 8/65* (2013.01); *G06F 11/3013* (2013.01); *G06F 11/3058* (2013.01); *G06F 11/327* (2013.01); *Y02B 60/183* (2013.01)

(58) Field of Classification Search
USPC ........ 701/1, 36, 29.6; 320/127; 711/103, 163, 711/155, 156; 248/551; 340/426.14
See application file for complete search history.

(56) References Cited

U.S. PATENT DOCUMENTS 6,957,136 B2 * 10/2005 Tachibana et al. .............. 701/36
2001/0023485 A1 9/2001 Yashiki et al.
(Continued)

FOREIGN PATENT DOCUMENTS

CN 1315275 A 10/2001
CN 101286651 A 10/2008
(Continued)

OTHER PUBLICATIONS

International Search Report, PCT/JP2011/061037 dated Jun. 21, 2011.
(Continued)

*Primary Examiner* — Adam Tissot
(74) *Attorney, Agent, or Firm* — Westerman, Hattori, Daniels & Adrian, LLP

(57) ABSTRACT

A rewriting apparatus of a vehicle program rewriting system predicts, on the basis of both a state of a battery at the time of starting rewriting the programs of ECUs and a scheduled process time period of rewiring the programs, a state of the battery after rewriting the programs, and executes rewriting the programs if the predicted state of the battery satisfies a condition on which the vehicle can be restarted.

5 Claims, 28 Drawing Sheets

(51) Int. Cl.
    *G06F 11/30*    (2006.01)
    *G06F 11/32*    (2006.01)

(56) References Cited

U.S. PATENT DOCUMENTS

| 2004/0122537 A1 | 6/2004 | Kouda et al. |
| 2006/0047374 A1 | 3/2006 | Hashimoto et al. |
| 2006/0208739 A1 | 9/2006 | Schiller et al. |
| 2008/0191664 A1 | 8/2008 | Abe |

FOREIGN PATENT DOCUMENTS

| JP | 04-185241 A | 7/1992 |
| JP | 10-161941 A | 6/1998 |
| JP | 2005-028951 A | 2/2005 |
| JP | 2006-72461 A | 3/2006 |
| JP | 2008-155892 A | 7/2008 |
| JP | 2009-275637 A | 11/2009 |
| WO | WO 2004/092758 A1 | 10/2004 |

OTHER PUBLICATIONS

Extended European Search Report, European Patent Application No. 11814350.2 dated Feb. 26, 2014.

Office Action dated Aug. 19, 2014, issued in corresponding Chinese Patent Application No. 201180037825.5, with Partial English Translation (8 pages).

* cited by examiner

VEHICLE PROGRAM REWRITING SYSTEM

CROSS-REFERENCED TO RELATED APPLICATION

This application is a National Stage entry of International Application PCT/JP2011/061037, filed May 13, 2011, which claims priority to Japanese Patent Application No. 2010-174785, filed Aug. 3, 2010, the disclosure of the prior application(s) are hereby incorporated in their entirety by reference.

TECHNICAL FIELD

The present invention relates to a vehicular program rewriting system (vehicle program rewriting system), which is capable of rewriting a program for an electronic control unit.

BACKGROUND ART

With advancements in computer technology, vehicles are becoming more and more computerized. Computerized vehicles are generally equipped with a plurality of electronic control units (ECUs). A program that is used by an ECU occasionally is rewritten to reflect a version upgrade or the like (see Japanese Laid-Open Patent Publication No. 2008-155892, hereinafter referred to as "JP2008-155892A").

According to JP2008-155892A, it is judged whether or not a program can be rewritten based on a remaining stored energy level of a battery and a predicted value of an amount of consumed electric energy required to rewrite the program (see summary). More specifically, according to JP2008-155892A, the remaining stored energy level of the battery is calculated based on the present voltage and temperature of the battery. The predicted value of the amount of consumed electric energy is calculated based on a time and a current of the battery that are required to rewrite the program. It is then judged whether or not the program can be rewritten, based on whether or not the remaining stored energy level is greater than the predicted value of the amount of consumed electric energy (see FIGS. 5 and 6, and paragraphs [0025] and [0026]).

SUMMARY OF INVENTION

According to JP2008-155892A, as described above, it is judged whether or not the program can be rewritten based on whether or not the remaining stored energy level is greater than the predicted value of the amount of consumed electric energy. If the remaining stored energy level and the predicted value of the amount of consumed electric energy differ only slightly from each other, then the remaining stored energy level will be almost nil after the program is rewritten. In such a case, sufficient electric power is not available for restarting a drive source such as an engine or the like, and the possibility exists that the vehicle cannot be restarted.

The present invention has been made in view of the above problems. It is an object of the present invention to provide a vehicular program rewriting system, which is capable of reliably restarting a vehicle after having rewritten a program for an ECU.

According to the present invention, there is provided a vehicular program rewriting system comprising an electronic control unit including a storage unit that stores a program therein and which is capable of rewriting the program, a rewriting device for rewriting the program, and a battery for supplying electric power in order to operate a drive source of a vehicle and the electronic control unit, wherein the rewriting device predicts a state of the battery after the program is rewritten, based on a state of the battery when the program starts to be rewritten and an expected processing time for rewriting the program, and the rewriting device rewrites the program if the predicted state of the battery satisfies a condition for restarting the vehicle.

According to the present invention, a state of the battery after the program is rewritten is predicted, and the program is rewritten if the predicted state of the battery satisfies the condition for restarting the vehicle. Therefore, the vehicle can reliably be restarted after the program has been rewritten.

The rewriting device may change the condition for restarting the vehicle depending on at least one of an ambient temperature in the vicinity of the vehicle, an engine coolant water temperature of the vehicle, and an internal resistance of the battery.

The rewriting device may predict a remaining stored energy level of the battery after the program is rewritten, based on the remaining stored energy level or charged ratio and a consumed current of the battery when the program starts to be rewritten and the expected processing time for rewriting the program, and may rewrite the program if the predicted remaining stored energy level is greater than a predetermined value. Therefore, a charged state of the battery after the program is rewritten can be predicted easily and the battery can be used. A charged ratio (SOC) may be used instead of the remaining stored energy level of the battery. The SOC (State Of Charge) is represented by the formula (remaining stored energy level [Ah]/fully charged stored energy level [Ah])×100[%]. If the SOC is 100%, the SOC indicates a fully charged state of the battery.

Alternatively, the rewriting device may predict an amount of electric power discharged from the battery from a predetermined charged state thereof until after the program is rewritten, based on the amount of electric power discharged from the battery from the predetermined charged state thereof until the program starts to be rewritten, a current consumed by the battery when the program starts to be rewritten, and the expected processing time for rewriting the program, and may rewrite the program if the predicted amount of electric power discharged from the battery is smaller than a predetermined value. Therefore, a charged state of the battery after the program is rewritten can be predicted easily and the battery can be used.

The rewriting device may stop rewriting the program if a current consumed by the battery or an internal resistance of the battery when the program starts to be rewritten is greater than a predetermined value, even though the predicted state of the battery satisfies the condition for restarting the vehicle. Generally, the internal resistance of the battery reflects a state of deterioration of the battery. Therefore, if the internal resistance of the battery is greater than a predetermined value, it becomes difficult to accurately predict the charged state of the battery after the program is rewritten. According to the present invention, the rewriting device stops rewriting the program if the current consumed by the battery or the internal resistance of the battery is greater than a predetermined value. Consequently, if the accuracy of the prediction is low, by stopping rewriting of the program, the possibility that the vehicle cannot be restarted is lowered.

DESCRIPTION OF EMBODIMENTS

Figure 1:
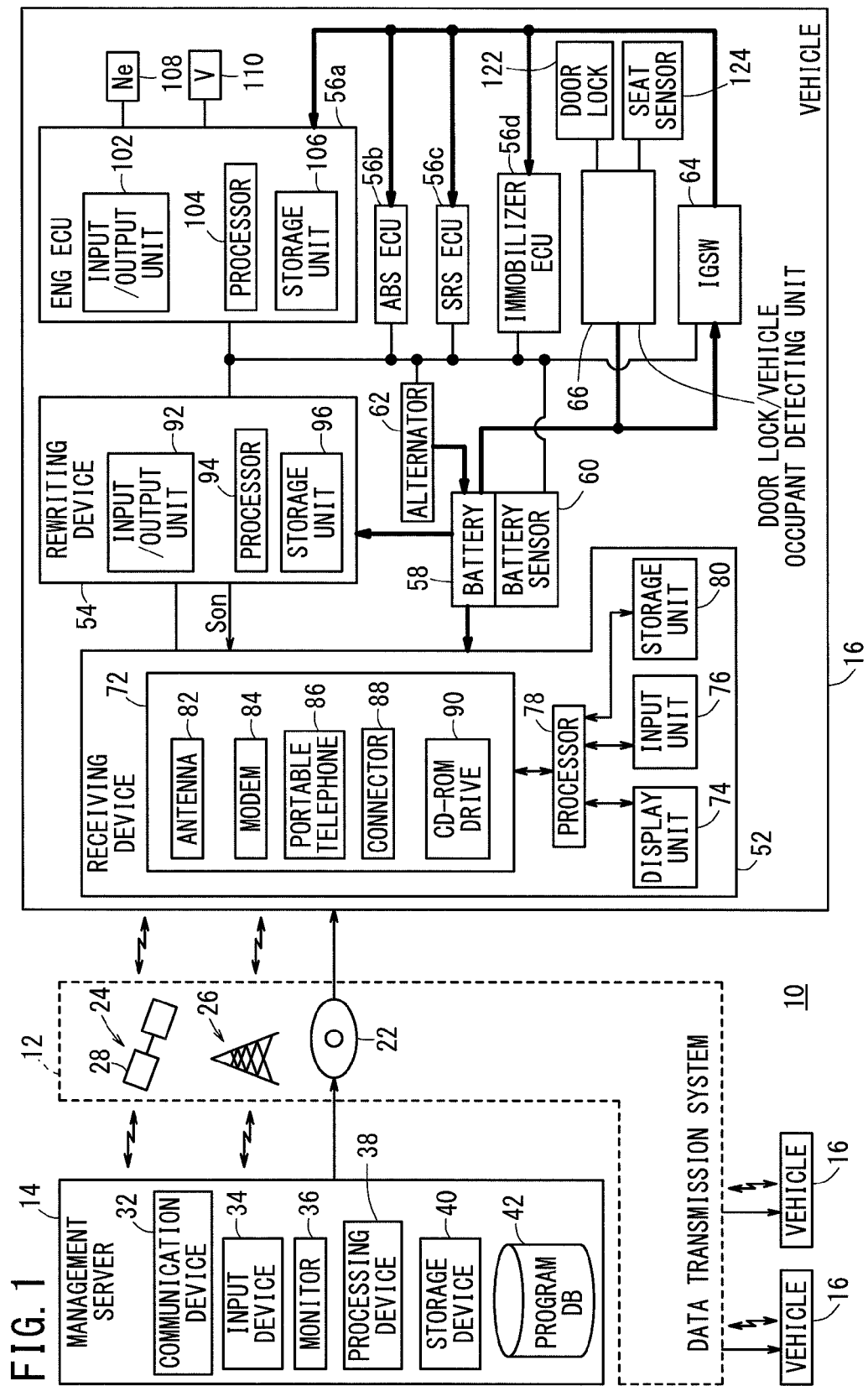
FIG. 1 is a block diagram of a vehicular program rewriting system according to an embodiment of the present invention.

[A. Present Embodiment]
1. Overall and Local Arrangements:
(1) Overall Arrangement:

FIG. 1 is a block diagram of a vehicular program rewriting system 10 (hereinafter referred to as a "rewriting system 10" or a "system 10") according to an embodiment of the present invention. The rewriting system 10 includes a data transmission system 12, a management server 14 (hereinafter referred to as a "server 14"), and a plurality of vehicles 16.

In the system 10, rewriting data (program), which are used to rewrite (update) programs stored in electronic control units 56a through 56d (hereinafter referred to as "ECUs 56a through 56d") in respective vehicles 16, are transmitted from the management server 14 through the data transmission system 12 to each of the vehicles 16. The ECUs 56a through 56d will hereinafter be referred to collectively as ECUs 56.

(2) Data Transmission System 12:

The data transmission system 12 includes a read-only compact disc 22 (hereinafter referred to as a "CD-ROM 22"), a satellite broadcasting network 24, and a mobile communications network 26.

The CD-ROM 22 stores rewriting data (program) therein. The CD-ROM 22 is delivered from the manufacturer of the vehicles 16 to users by a transportation means (trucks, cargo trains, etc.) made up of transport operators (postal services, home delivery services).

The satellite broadcasting network 24 can distribute rewriting data (program) via a satellite broadcast using a broadcasting satellite 28. The satellite broadcast may be a satellite digital audio broadcast for mobile terminals (Sirius XM Radio in North America, etc.), for example.

The mobile communications network 26 is a communication network capable of performing communications using a portable telephone 86. The mobile communications network 26 can send rewriting data (program) to the vehicles 16 by way of communications with the portable telephone 86.

According to the present embodiment, rewriting data (program) can be sent to the vehicles 16 using the CD-ROM 22, the satellite broadcasting network 24, or the mobile communications network 26.

(3) Management Server 14:

The management server 14 includes a communication device 32, an input device 34, a monitor 36, a processing device 38, a storage device 40, and a rewriting program database 42 (hereinafter referred to as a "rewriting program DB 42" or a "program DB 42"). When the administrator or an equivalent entity (hereinafter referred to as an "administrator or the like") of the management server 14 produces rewriting data (program), the produced rewriting data (program) is stored in the program DB 42 via the input device 34.

If rewriting data (program) are distributed using the satellite broadcasting network 24, then the administrator or the like distributes the rewriting data (program) through the broadcasting satellite 28 or the like.

If rewriting data (program) are broadcast using the mobile communications network 26, then the administrator or the like uploads new rewriting data (program) into the server 14. When a request for transmission of the rewriting data (program) is received from the portable telephone 86 installed in the vehicle 16, the server 14 sends the rewriting data (program) to the portable telephone 86 through the communication device 32 and the mobile communications network 26.

If rewriting data (program) are transmitted using the CD-ROM 22, then the administrator or the like stores the rewriting data (program) in the CD-ROM 22, and sends the CD-ROM 22 to respective users by way of transportation operators. Strictly speaking, there may be instances in which the CD-ROM 22 is not sent from the management server 14. However, instances in which the CD-ROM 22 is sent from the management server 14 will be described below, and the description shall be understood to include instances in which the CD-ROM 22 is not sent from the management server 14.

(4) Vehicles 16:

(a) Arrangement of Vehicles 16:

Each of the vehicles 16 has a receiving device 52, a program rewriting device 54 (hereinafter referred to as a "rewriting device 54"), a plurality of ECUs 56, a battery 58, a battery sensor 60, an alternator 62, an ignition switch 64 (hereinafter referred to as an "IGSW 64"), and a door lock/vehicle occupant detecting unit 66 (hereinafter referred to as a "detecting unit 66") (The term "vehicle occupant" here includes a user, a driver, and a passenger). Although the vehicles 16 are gasoline-powered vehicles in the present embodiment, the vehicles 16 may be diesel vehicles or electric vehicles (including fuel cell vehicles, hybrid vehicles, etc.).

In each of the vehicles 16, the receiving device 52 receives rewriting data (program) transmitted from the management server 14 through the data transmission system 12. The rewriting data (program) received by the receiving device 52 are written to a target ECU 56 by the rewriting device 54.

In FIG. 1, the internal configuration of only the right-hand vehicle 16 is illustrated. Internal configurations of the other vehicles 16 are omitted from illustration.

(b) Receiving Device 52:

The receiving device 52 includes a data receiver 72, a display unit 74, an input unit 76, a processor 78, and a storage unit 80.

The data receiver 72 includes a wireless antenna 82, a modem 84, a portable telephone 86, a connector 88 for the portable telephone 86, and a CD-ROM drive 90 (hereinafter referred to as a "drive 90").

When rewriting data (program) are distributed through the satellite broadcasting network 24, the receiving device 52 receives the rewriting data (program) using the wireless antenna 82 and the modem 84. When rewriting data (program) are transmitted through the mobile communications network 26, the receiving device 52 receives the rewriting data (program) using the portable telephone 86. When rewriting data (program) are transmitted through the CD-ROM 22, the receiving device 52 receives the rewriting data (program) by reading the rewriting data (program) from the CD-ROM 22, which has been inserted into the drive 90. The portable telephone 86, which is carried by the user on a regular basis, is connected to the connector 88 while the vehicle 16 is traveling. Alternatively, the portable telephone 86 may be used exclusively in the vehicle 16 and connected to the connector 88 at all times.

The display unit 74 displays various items of information for the user. The input unit 76 receives input signals depending on actions made by the user. According to the present embodiment, the display unit 74 and the input unit 76 may comprise a touch panel, for example.

The processor 78 controls various components of the receiving device 52. The storage unit 80, which comprises a volatile memory and a nonvolatile memory (not shown) stores a control program for the receiving device 52, and also stores rewriting data (program) for rewriting programs intended for the ECUs 56.

The receiving device 52 may also function as a navigation device. Stated otherwise, an existing navigation device may function as the receiving device 52 according to the present embodiment.

(c) Rewriting Device 54:

The rewriting device 54, which rewrites the programs for the respective ECUs 56, has an input/output unit 92, a processor 94, and a storage unit 96. Functional and operational details of the rewriting device 54 will be described later.

(d) ECUs 56:

The ECUs 56 control various parts of the vehicle 16. The ECUs 56 include, for example, an engine electronic control unit 56a (hereinafter referred to as an "ENG ECU 56a") for controlling the output power of an engine, not shown, an antilock brake system electronic control unit 56b (hereinafter referred to as an "ABS ECU 56b") for controlling a brake system, not shown, a supplementary restraint system electronic control unit 56c (hereinafter referred to as an "SRS ECU 56c") for controlling air bags, not shown, an immobilizer electronic control unit 56d (hereinafter referred to as an "immobilizer ECU 56d") for controlling an immobilizer system, not shown. As described above, the ECUs 56a through 56d will hereinafter be referred to collectively as ECUs 56.

Each of the ECUs 56 includes an input/output unit 102, a processor 104, and a storage unit 106. In FIG. 1, only the input/output unit 102, the processor 104, and the storage unit 106 of the ENG ECU 56a are illustrated. The input/output units 102, the processors 104, and the storage units 106 of the other ECUs 56b through 56d are omitted from illustration.

The ENG ECU 56a is connected to an engine rotational speed sensor 108 for detecting an engine rotational speed Ne [rpm], and to a vehicle speed sensor 110 for detecting a vehicle speed V [km/h] of the vehicle 16.

(e) Battery 58:

The battery 58 supplies electric power to the receiving device 52, the rewriting device 54, and the ECUs 56. The receiving device 52 is selectively supplied with electric power through the IGSW 64, although the receiving device 52 may selectively be supplied with electric power depending on a command (startup signal Son) from the rewriting device 54. The rewriting device 54 is connected to the battery 58 at all times. The ECUs 56 are selectively supplied with electric power through the IGSW 64. Details will be described later with reference to FIG. 2.

The battery 58 also supplies electric power for controlling operations of the engine, not shown (operation of a control system of the engine, etc.).

(f) Battery Sensor 60:

The battery sensor 60 detects a charged ratio or a state of charge (hereinafter referred to as "SOC"), an internal resistance R, a voltage (hereinafter referred to as a "battery voltage Vbat"), a consumed current (discharged current) (hereinafter referred to as a "battery current Ibat"), and a fluid temperature (hereinafter referred to as a "battery fluid temperature Tbat") of the battery 58.

The SOC is detected from an integrated value of the battery current Ibat and an open-circuit voltage (hereinafter referred to as an "OCV") of the battery 58. The internal resistance R is detected based on a reduction in the battery voltage Vbat due to a large current that is discharged when the engine is started. The battery fluid temperature Tbat is estimated from the ambient temperature, which is detected by the battery sensor 60, a charging current, and the volume of the battery 58. The battery sensor 60 may detect a remaining stored energy level [Ah] instead of the SOC [%].

(g) Alternator 62:

The alternator 62, which is connected to a non-illustrated engine, generates electric power based on the power of the engine. Electric power generated by the alternator 62 is supplied to the battery 58 in order to charge the battery 58, and also is supplied to other accessories, not shown.

(h) IGSW 64:

The IGSW 64 according to the present embodiment is a rotary type ignition switch, which is capable of selecting positions "OFF", "ACC" (accessory), and "ON" successively from the left as viewed toward an instrument panel (not shown). When the IGSW 64 is further turned to the right (clockwise) from the "ON" position, the IGSW 64 comes to a position "ST" (engine start), thereby starting the engine.

According to the present embodiment, when the IGSW 64 is in the "OFF" position, the battery 58 essentially stops supplying electric power to the receiving device 52 and the ECUs 56.

As described later, if the vehicle 16 has a so-called smart start function, then the IGSW 64 may comprise a push switch, which is used in combination with such a smart start function.

(i) Door Lock/Vehicle Occupant Detecting Unit 66:

The detecting unit 66 detects an unlocked/locked state of a door lock 122 as well as an operational state of a seat sensor 124, and sends an output signal Sh (FIG. 2) to the rewriting device 54. The seat sensor 124 comprises a pressure sensor disposed in the seat, and is capable of judging whether or not the vehicle occupant is seated in the seat based on the detected value thereof. When the vehicle occupant is not seated in the seat, the detected value of the seat sensor 124 is nil. The output signal Sh represents an unlocked/locked state of the door lock 122, and provides information concerning whether or not the vehicle occupant is seated in the seat that incorporates the seat sensor 124 therein.

Figure 2:
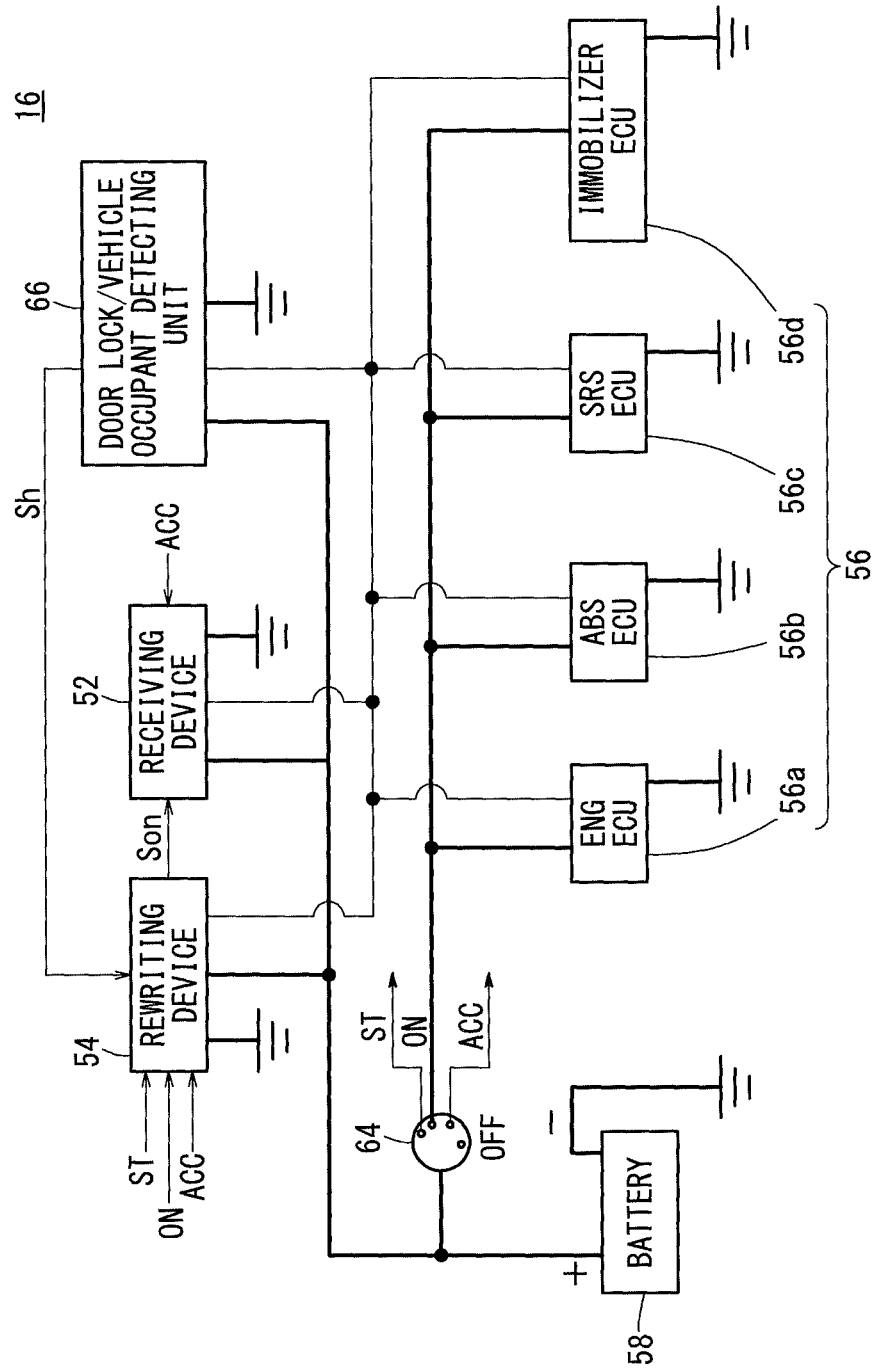
FIG. 2 is a block diagram showing the manner in which electric power is supplied and signals are input and output in a vehicle.

2. Electric Power Supply Arrangement:

FIG. 2 is a block diagram showing the manner in which electric power is supplied and signals are input and output in the vehicle 16.

As shown in FIG. 2, electric power from the battery 58 (hereinafter referred to as a "battery power Pbat") [W] is supplied directly to the receiving device 52, the rewriting device 54, and the detecting unit 66. Thus, the receiving device 52, the rewriting device 54, and the detecting unit 66 are capable of operating regardless of the position to which the IGSW 64 is turned.

According to the present embodiment, the receiving device 52 usually is turned on using the battery power Pbat when the IGSW 64 is in the "ACC" or the "ON" position, and turned off without using the battery power Pbat when the IGSW 64 is in the "OFF" position. In exceptional cases, when the receiving device 52 receives a startup signal Son from the rewriting device 54, the receiving device 52 is turned on using the battery power Pbat until the receiving device 52 receives a canceling command from the rewriting device 54, even if the IGSW 64 is in the "OFF" position.

The battery power Pbat is supplied to the ECUs 56 through the IGSW 64. More specifically, when the IGSW 64 is in the "ON" position, the battery power Pbat is supplied to the ECUs 56. When the IGSW 64 is in the "OFF" or the "ACC" position, the battery power Pbat is not supplied to the ECUs 56.

The detecting unit 66 sends to the rewriting device 54 an output signal Sh (a door lock signal, a door unlock signal, a vehicle occupant detecting signal) representing an unlocked/locked state of the door lock 122 and whether the vehicle occupant is seated in a prescribed seat. The rewriting device 54 judges whether or not the user (vehicle occupant) is in the vehicle 16 based on the output signal Sh, and uses the judgment result in subsequent processing sequences (to be described later).

Figure 3:
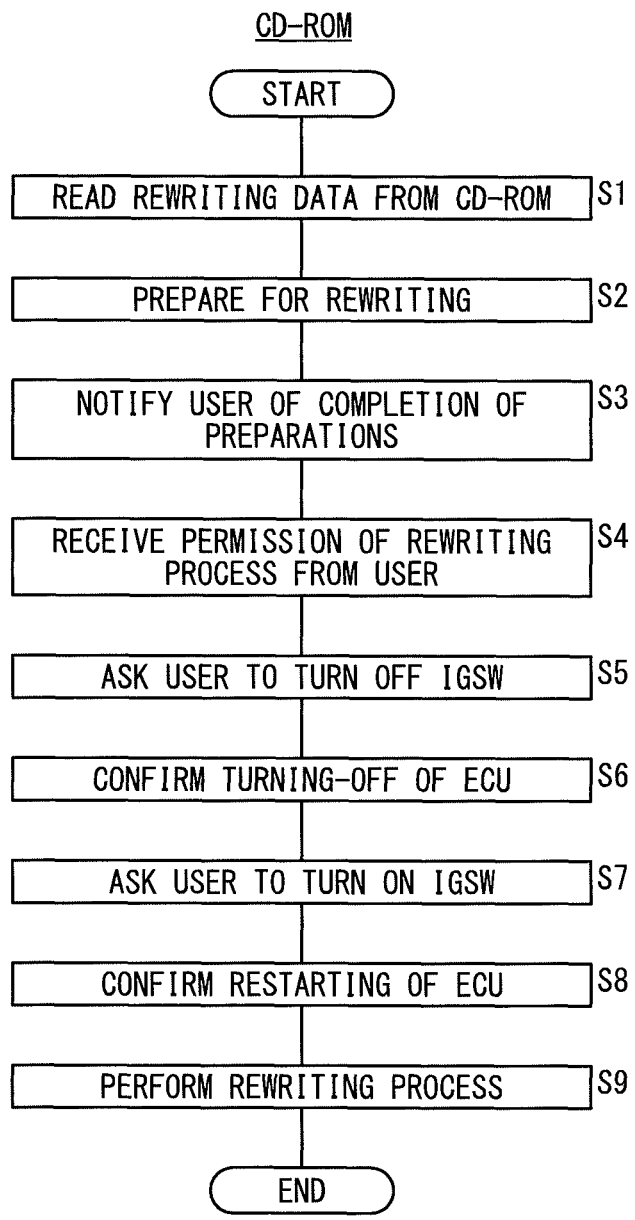
FIG. 3 is a flowchart of a general outline of a processing sequence for rewriting a program for an electronic control unit (ECU) with rewriting data (program) transmitted through a CD-ROM.

3. Program Rewriting:

(1) Rewriting Data (Program) Transmitted through CD-ROM 22:

(a) Outline of Rewriting Process:

FIG. 3 is a flowchart of a general outline of a processing sequence for rewriting a program intended for the ECU 56, together with rewriting data (program) transmitted through the CD-ROM 22.

In step S1, the receiving device 52 reads rewriting data (program) from the CD-ROM 22 when the user inserts the CD-ROM 22 into the drive 90 of the receiving device 52.

In step S2, the vehicle 16 undertakes preparations for rewriting the program. Such preparations include confirming the state of the battery 58, as will be described in detail later.

In step S3, the vehicle 16 sends a notice to the user indicating completion of preparations for rewriting the program. In step S4, the vehicle 16 receives permission from the user to perform a process for rewriting the program.

In step S5, the vehicle 16 requests that the user turn the IGSW 64 to the "OFF" position. At this time, a setting is made to keep the receiving device 52 on, even if the IGSW 64 is turned to the "OFF" position. In step S6, in response to the IGSW 64 being turned to the "OFF" position, the vehicle 16 confirms that the ECUs 56 have been turned off. The receiving device 52 remains turned on.

In step S7, the vehicle 16 requests that the user turn the IGSW 64 to the "ON" position. In step S8, in response to the IGSW 64 being turned to the "ON" position, the vehicle 16 confirms that the ECUs 56 have been restarted (turned on).

In step S9, the vehicle 16 performs a process for rewriting the program. However, as described later, in step S9, the vehicle 16 judges whether or not the program can be rewritten, and does not rewrite the program if it is determined that the program cannot be rewritten.

During steps S1 through S5, the vehicle 16 is capable of being driven. During steps S6 through S9, the engine is shut off and hence the vehicle 16 is not capable of being driven. During steps S1 through S3, another CD-ROM 22 (e.g., a music CD-ROM) cannot be inserted into the drive 90.

(b) Details of Rewriting Process:

FIGS. 4 through 11 are flowcharts showing details of a processing sequence for rewriting the program intended for the ECU 56 with rewriting data (program) that is transmitted through the CD-ROM 22. FIG. 12 is a screen transition diagram showing an example of screen transitions displayed on the display unit 74, which correspond to portions of the flowcharts shown in FIGS. 8 and 9.

Steps S11 through S13 correspond to step S1 of FIG. 3, and steps S14 through S34 correspond to step S2. Step S35 corresponds to step S3, and steps S36 and S37 correspond to step S4. Steps S38 and S39 correspond to step S5, and steps S40 and S41 correspond to step S6. Step S42 corresponds to step S7, and step S43 corresponds to step S8. Steps S44 through S67 correspond to step S9.

In step S11, the CD-ROM 22 is inserted into the drive 90 of the receiving device 52. In step S12, the receiving device 52 judges whether or not the inserted CD-ROM 22 contains rewriting data (program) for the ECU 56. If the inserted CD-ROM 22 does not contain rewriting data (program) for the ECU 56 (step S12: NO), the present processing sequence comes to an end. If the inserted CD-ROM 22 contains rewriting data (program) for the ECU 56 (step S12: YES), then in step S13, the receiving device 52 reads the rewriting data (program) from the CD-ROM 22. While reading the rewriting data (program), the receiving device 52 displays on the display unit 74 information indicating that reading of the rewriting data (program) is currently taking place. For example, the receiving device 52 displays a message "READING REWRITING DATA. ALTHOUGH VEHICLE CAN BE DRIVEN, YOU CANNOT USE THE CD-ROM DRIVE", for example, on the display unit 74.

When the receiving device 52 has completed reading the rewriting data (program), the receiving device 52 notifies the rewriting device 54 in step S14 that reading of the rewriting data (program) has been completed.

In step S15, the rewriting device 54 judges whether or not a previous rewriting process has been completed. For example, if the rewriting device 54 stores other rewriting data (program), but has not yet performed a rewriting process using such stored rewriting data (program), then the previous rewriting process has not been completed.

In step S16, the rewriting device 54 sends a notice to the receiving device 52 indicating the result of step S15.

Figure 5:
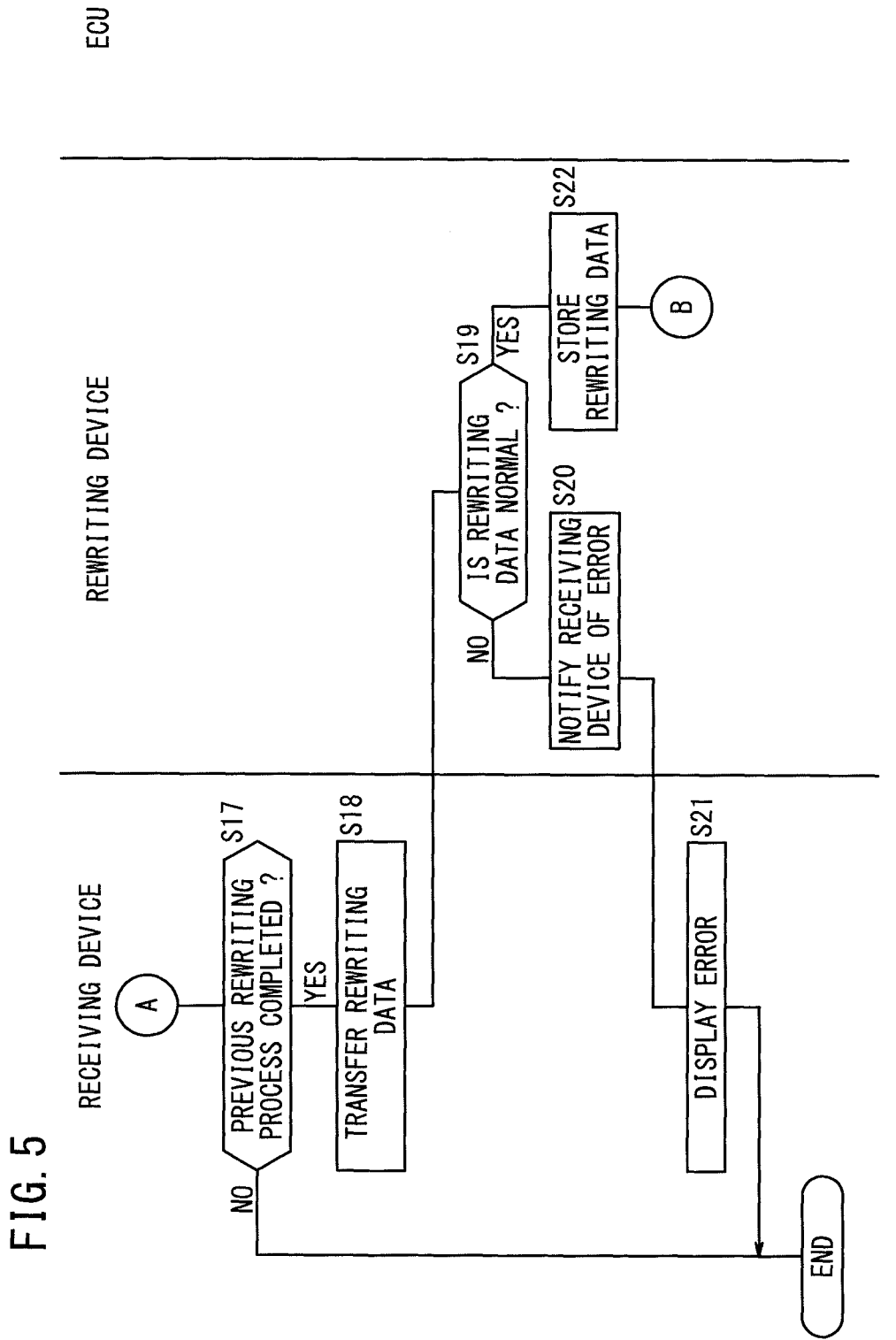
FIG. 5 is a second flowchart showing details of the processing sequence for rewriting a program for an ECU with rewriting data (program) transmitted through a CD-ROM.

In step S17 of FIG. 5, the receiving device 52 confirms whether or not a previous rewriting process has been completed based on the notice from the rewriting device 54. If a previous rewriting process has been completed (step S17: YES), then control proceeds to step S18. If a previous rewriting process has not been completed (step S17: NO), then the previous rewriting process is preferentially completed. Therefore, the vehicle 16 finishes the present rewriting process. The receiving device 52 may display a message on the display unit 74 prompting the user to carry out the previous rewriting process. If the storage unit 80 of the receiving device 52 or the storage unit 96 of the rewriting device 54 has free storage space, then it is possible to store the presently received rewriting data (program) therein.

In step S18, the receiving device 52 transfers the rewriting data (program) to the rewriting device 54.

In step S19, the rewriting device 54 judges whether or not the rewriting data (program) are normal based on, for example, whether the rewriting data (program) have a proper data structure and/or whether the rewriting data (program) have a proper hash value.

If the rewriting data (program) are not normal (step S19: NO), then in step S20, the rewriting device 54 notifies the receiving device 52 of an error. In step S21, the receiving device 52 displays the error on the display unit 74, and erases the rewriting data (program) stored in the storage unit 80, after which the present processing sequence is brought to an end. The displayed error may be in the form of a message to the effect that, since the rewriting data (program) contains a fault therein, the dealer should be contacted.

If the rewriting data (program) are normal (step S19: YES), then in step S22, the rewriting device 54 stores the rewriting data (program) in the storage unit 96.

In step S23 of FIG. 6, the rewriting device 54 asks an ECU 56 into which a program is to be rewritten with rewriting data (program) stored in the storage unit 96 (hereinafter referred to as a "target ECU 56*tar*") for program identification information (hereinafter referred to as a "program ID") which identifies the content, such as the version, of the present program to be rewritten.

In step S24, the target ECU 56*tar* sends the program ID of the present program to the rewriting device 54.

In step S25, the rewriting device 54 judges whether or not the program indicated by the program ID received from the target ECU 56*tar* is compatible with the received rewriting data (program) by comparing the respective program IDs with each other, for example. If the program is not compatible with the received rewriting data (program) (step S26: NO), then in step S27, the rewriting device 54 notifies the receiving device 52 of an error. In step S28, the receiving device 52 displays the error on the display unit 74, and erases the rewriting data (program) stored in the storage unit 80, after which the present processing sequence is brought to an end.

If the program is compatible with the received rewriting data (program) (step S26: YES), then in step S29, the rewriting device 54 requests the SOC and the battery current Ibat at present from a prescribed ECU (in the present embodiment, the ENG ECU 56*a*). The rewriting device 54 may ask another component, e.g., the battery sensor 60, for the SOC and the battery current Ibat at present, assuming that such values are available from the other component.

In step S30, the ENG ECU 56*a* sends the SOC and the battery current Ibat at present to the rewriting device 54.

Figure 7:
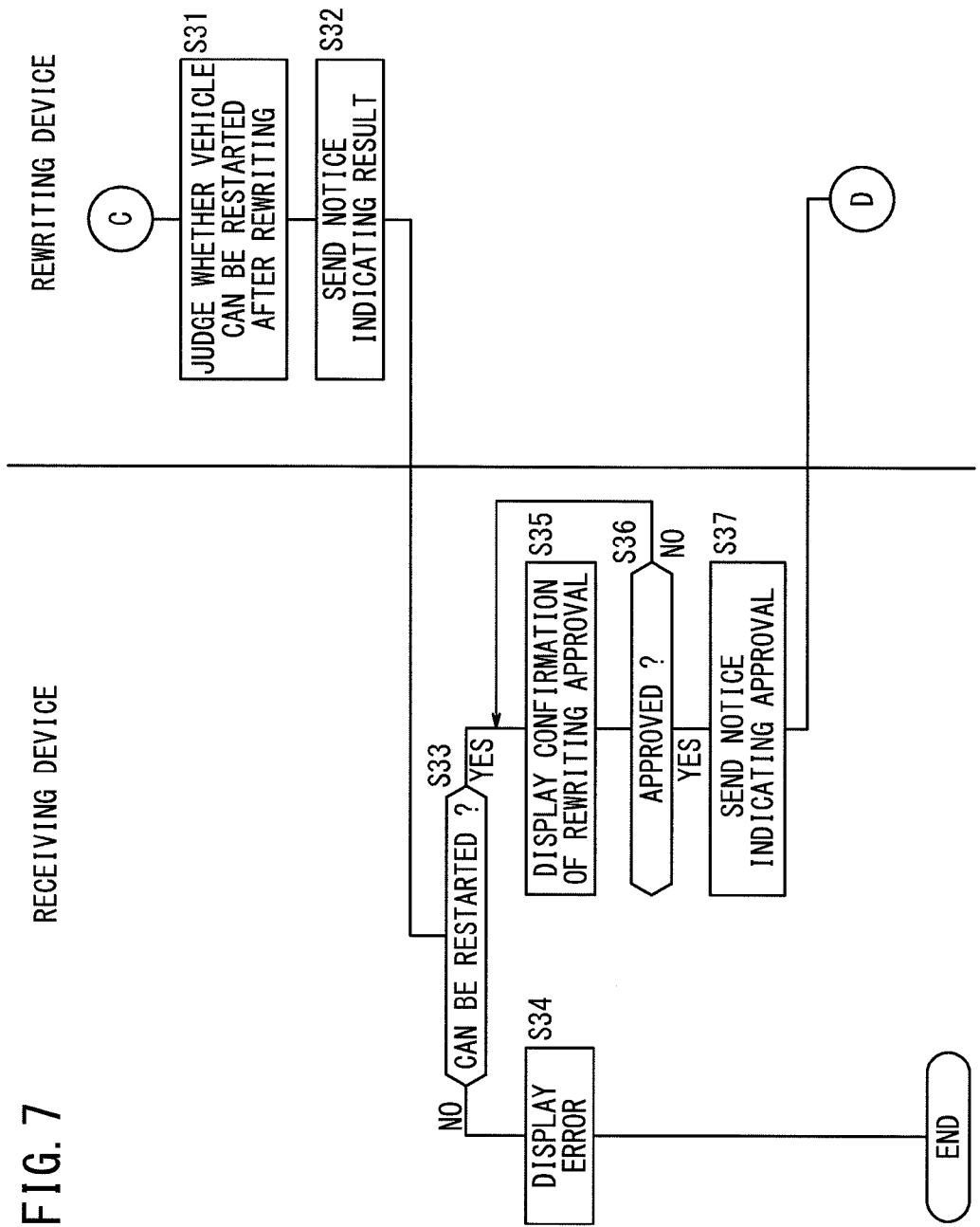
FIG. 7 is a fourth flowchart showing details of the processing sequence for rewriting a program for an ECU with rewriting data (program) transmitted through a CD-ROM.

In step S31 of FIG. 7, based on the SOC [%] and the battery current Ibat [A] at present, the rewriting device 54 judges whether or not the vehicle 16, particularly the engine, can be restarted after the program is rewritten with the rewriting data (program). More specifically, the rewriting device 54 judges whether or not the following inequality (1) is satisfied:

$$SOC - (Ibat \times Tre \times K) > THsoc \quad (1)$$

where Tre represents an expected processing time [sec] required to rewrite the program, K represents a constant [%/(A·sec)] for converting electric power consumed during rewriting the program into the SOC, and THsoc [%] represents a threshold value (minimum value) for the SOC required in order to restart the vehicle 16.

The expected processing time Tre is established based on the amount Sd of the rewriting data (program), which is included in the rewriting data (program), for example. Alternatively, the processor 94 of the rewriting device 54 may calculate the expected processing time Tre based on the amount Sd of the rewriting data (program).

The threshold value THsoc is a measured value or a simulated value, which is included in the rewriting data (program). Alternatively, the threshold value THsoc may be stored in advance in the storage unit 96 of the rewriting device 54. Although the threshold value THsoc may be a single fixed value, the threshold value THsoc may also be established depending on at least one of the ambient temperature Tc [° C.]

in the vicinity of the vehicle 16, the engine coolant water temperature Tw [° C.] of the vehicle 16, and the internal resistance R [Ω] of the battery 58. If the ambient temperature Tc is used, then the threshold value THsoc is set to a value that becomes higher as the ambient temperature Tc is lower. If the engine coolant water temperature Tw is used, then the threshold value THsoc is set to a value that becomes higher as the engine coolant water temperature Tw is lower. If the internal resistance R is used, then the threshold value THsoc is set to a value that becomes higher as the internal resistance R is higher.

In step S32, the rewriting device 54 sends a notice to the receiving device 52 indicating the result of step S31. If the result of step S31 indicates that the vehicle 16 cannot be restarted (step S33: NO), then in step S34, the receiving device 52 displays an error message on the display unit 74 in step S34. For example, the receiving device 52 displays on the display unit 74 a message to the effect that, since the battery 58 does not have a sufficient energy level, the rewriting process must be carried out again after the battery 58 has been charged. If the result of step S31 indicates that the vehicle 16 can be restarted (step S33: YES), then in step S35, the receiving device 52 displays on the display unit 74 a message to the effect that, in order to rewrite the program for the target ECU 56tar, the vehicle 16 should be moved to a safe location. The message is displayed together with a button, which is represented by a button image that is touched in order to approve rewriting of the program after the vehicle 16 has been moved.

If the button is not touched, and hence the user does not permit rewriting of the program (step S36: NO), then control returns to step S35. If the button is touched, and hence the user approves rewriting of the program (step S36: YES), then in step S37, the receiving device 52 indicates the user's approval to the rewriting device 54.

Figure 8:
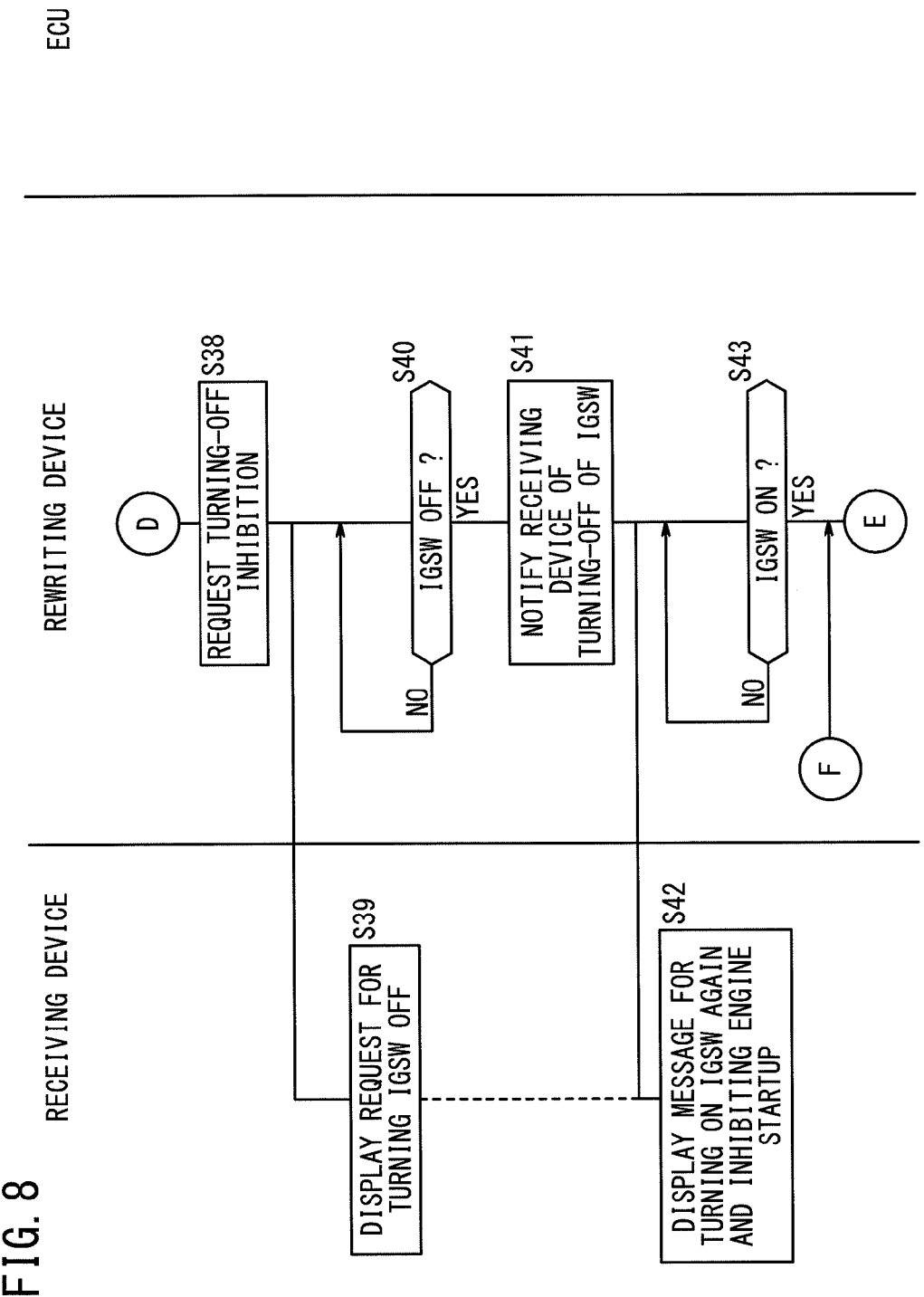
FIG. 8 is a fifth flowchart showing details of the processing sequence for rewriting a program for an ECU with rewriting data (program) transmitted through a CD-ROM.

In step S38 of FIG. 8, the rewriting device 54 sends a startup signal Son to the receiving device 52 requesting that turning-off of the receiving device 52 be inhibited. Therefore, even if the IGSW 64 is in the "OFF" position, the receiving device 52 is continuously kept in an ON state.

In step S39, the receiving device 52 displays on the display unit 74 a message requesting the user to turn the IGSW 64 to the "OFF" position. The message may be represented by the phrase "TURN OFF IGNITION SWITCH", for example, as indicated by the screen 132 shown in FIG. 12. The message is displayed continuously until the receiving device 52 receives an indication from the rewriting device 54 that the ECU 56 has been turned off.

In step S40, the rewriting device 54 reads the position to which the IGSW 64 is turned, and judges whether or not the IGSW 64 is turned off. If the user has not turned the IGSW 64 and it is not detected that the IGSW 64 is turned off (step S40: NO), then step S40 is repeated. If the user has turned the IGSW 64 and the IGSW 64 is detected as being turned off (step S40: YES), then the rewriting device 54 indicates to the receiving device 52 that the IGSW 64 has been turned off, i.e., that the ECU 56 is turned off. The rewriting device 54 may judge whether or not the IGSW 64 is turned off by sending a response request to a certain one or more of the ECUs 56, and judging whether or not a response is received. If a response is received from a certain one or more of the ECUs 56, then the rewriting device 54 decides that the IGSW 64 is not turned off. If no response is received from a certain one or more of the ECUs 56, then the rewriting device 54 determines that the IGSW 64 has been turned off.

In step S42, the receiving device 52 displays on the display unit 74 a message requesting the user to turn on the IGSW 64 again and to inhibit starting of the engine. The message may be represented by the phrase "TURN ON IGNITION SWITCH (DO NOT START ENGINE)", for example, as indicated by the screen 134 shown in FIG. 12. The message is displayed continuously until the rewriting device 54 determines that the IGSW 64 has been turned on.

In step S43, the rewriting device 54 reads the position to which the IGSW 64 is turned, and judges whether or not the IGSW 64 is turned on. Alternatively, as in step S40, the rewriting device 54 may judge whether or not the IGSW 64 is turned on by sending a response request to a certain one or more of the ECUs 56 and judging whether or not a response is received. If the user has not turned the IGSW 64, and the IGSW 64 is not detected as being turned off (step S43: NO), then step S43 is repeated. If the user has turned the IGSW 64, and the IGSW 64 is detected as being turned on (step S43: YES), then control proceeds to step S44.

Figure 9:
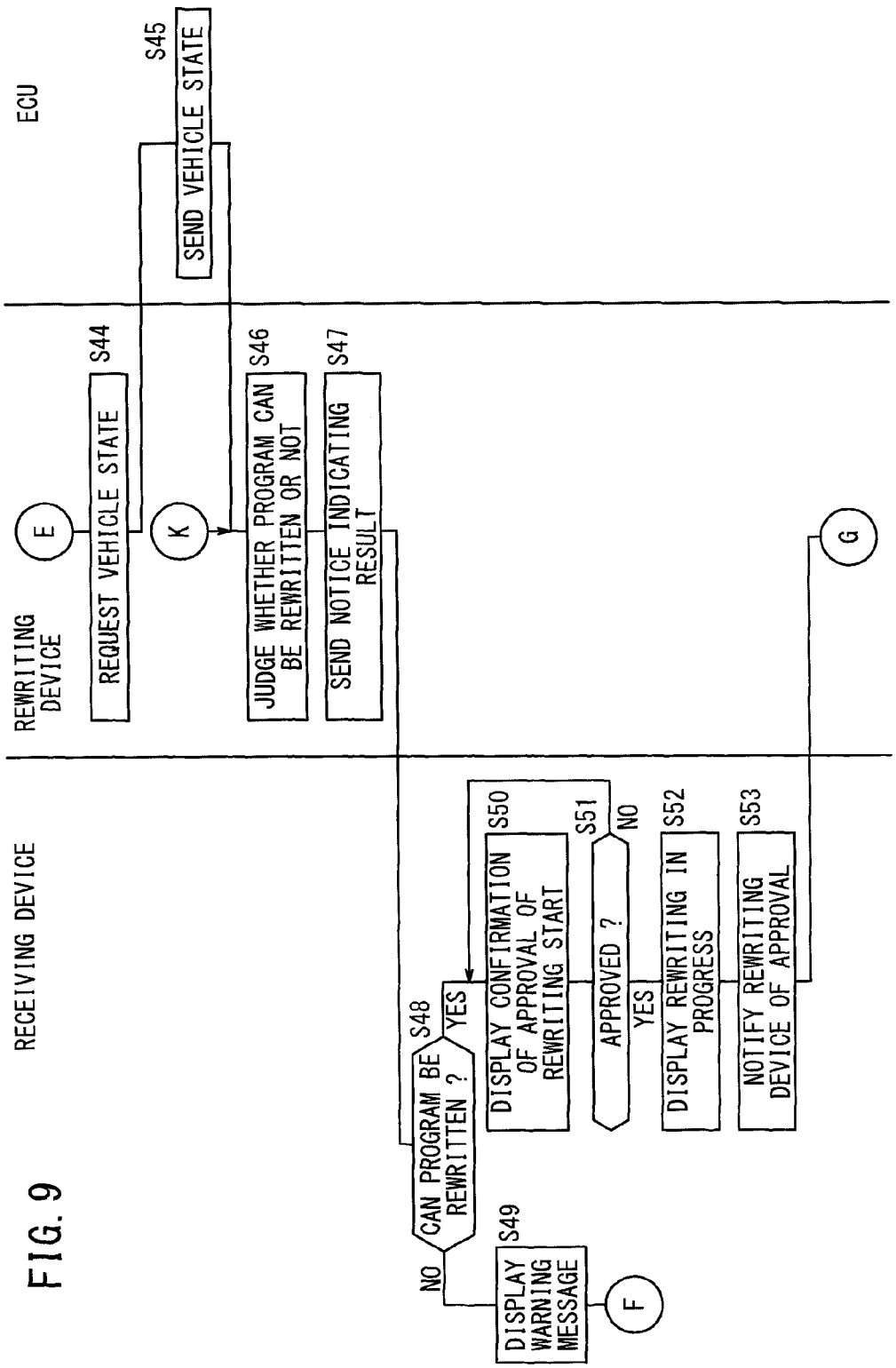
FIG. 9 is a sixth flowchart showing details of the processing sequence for rewriting a program for an ECU with rewriting data (program) transmitted through a CD-ROM.

In step S44 of FIG. 9, the rewriting device 54 requests various states of the vehicle 16 from certain ones of the ECUs 56. The states of the vehicle 16 may include the engine rotational speed Ne, the vehicle speed V, a gearshift position, temperatures of the ECUs 56, the operational state of the immobilizer ECU 56d, the operational state of the air conditioner of the vehicle 16, the operational state of heating wires of a rear windshield of the vehicle 16, the operational state of the headlights of the vehicle 16, and the operational state of a seat heater of the vehicle 16. According to the present embodiment, the aforementioned various states of the vehicle 16 are acquired from the ECUs 56. However, such states may be acquired directly from various sensors.

In step S45, the ECUs 56 send the states of the vehicle 16 to the rewriting device 54.

In step S46, the rewriting device 54 judges whether or not the vehicle 16 is in a state in which the program can be rewritten, by judging whether all of the following conditions (i) through (v), for example, are satisfied.

(i) The engine rotational speed Ne is 0 [rpm];
(ii) The vehicle speed V is 0 [km/hr]
(iii) The gearshift position is position P (Park);
(iv) The target ECU 56tar is at or below a temperature (threshold value THe) at which the program can be rewritten; and
(v) The immobilizer ECU 56d determines that a proper key has been inserted.

Among the above conditions, conditions (i) through (iii) serve to confirm that the vehicle 16 is at rest, condition (iv) serves to evaluate an operation fault of the ECUs 56, and condition (v) serves to confirm that a proper person is using the vehicle 16.

At this time, the rewriting device 54 also judges whether any one of the following conditions (vi) through (ix) is satisfied.

(vi) The air conditioner is turned off;
(vii) The heating wires of the rear windshield are turned off;
(viii) The headlights are turned off; and
(ix) The seat heater is turned off.

The above conditions (vi) through (ix) are used to judge how much battery power Pbat is consumed, and to request the user to suppress consumption of electric power. Even if conditions (vi) through (ix) are not satisfied, the rewriting device 54 does not decide that the program cannot be rewritten. However, the user is warned about such conditions in step S50, to be described later.

In step S47, the rewriting device 54 sends a notice to the receiving device 52 indicating the result of step S36. If any one of conditions (i) through (v) is not satisfied, thus indicating that the program cannot be rewritten (step S48: NO), then in step S49, the receiving device 52 displays on the display unit 74 a warning message pointing out which of the conditions (i) through (v) are not satisfied, thereby prompting the user to undertake efforts to satisfy the conditions. Thereafter, control returns to step S44.

However, even if the program cannot be rewritten, the receiving device 52 may not send a special signal to the rewriting device 54. Stated otherwise, if the rewriting device 54 determines that the program cannot be rewritten in step S46, then in step S47, the rewriting device 54 may send the result to the receiving device 52, after which control returns to step S44.

If the rewriting device 54 determines that the program can be rewritten (step S48: YES), then in step S50, the receiving device 52 displays on the display unit 74 an operation screen in order to confirm the user's approval to start the rewriting process (rewriting start approval screen). The operation screen can include the message "IS IT OK TO START REWRITING PROGRAM?", a "YES" button for approving start of the rewriting process, and a "NO" button for not approving start of the rewriting process, as indicated by the screen 136 shown in FIG. 12. At this time, if any one of the conditions (vi) through (ix) is not satisfied, the display unit 74 may also display a warning message to the effect that one of the conditions (vi) through (ix) has not been satisfied.

If the user does not perform any action on the operation screen, and hence does not approve start of the rewriting process (step S51: NO), then control returns to step S50. If the user performs an action on the operation screen, and hence approves start of the rewriting process (step S51: YES), then in step S52, the receiving device 52 displays on the display unit 74 a message indicating that the program is currently being rewritten. For example, the receiving device 52 displays on the display unit 74 the message "PROGRAM IS BEING REWRITTEN. DO NOT TURN OFF IGNITION SWITCH." Although not shown, if the user touches the "NO" button for not approving start of the rewriting process, the program is not rewritten, and the processing sequence is brought to an end. In this case, if the IGSW 64 is turned at a subsequent time, the processing sequence is started from step S29.

In step S53, the receiving device 52 notifies the rewriting device 54 that the user has approved start of the rewriting process.

Figure 10:
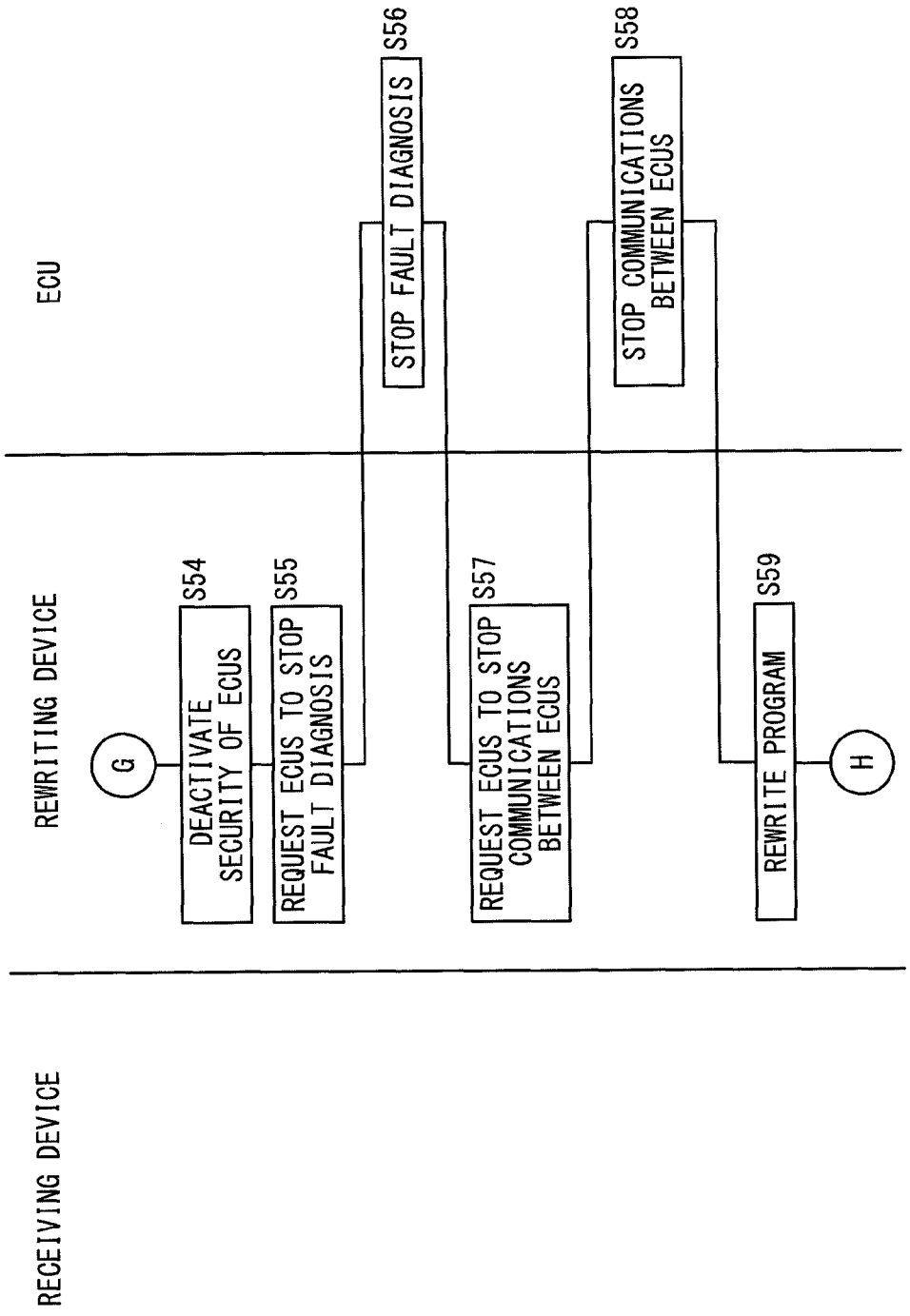
FIG. 10 is a seventh flowchart showing details of the processing sequence for rewriting a program for an ECU with rewriting data (program) transmitted through a CD-ROM.

In step S54 of FIG. 10, the rewriting device 54 communicates with the ECUs 56 and deactivates security features of the ECUs 56.

In step S55, the rewriting device 54 requests the ECUs 56 to stop a fault diagnosis process that is currently being conducted between the ECUs 56. In step S56, each of the ECUs 56 stops the fault diagnosis process.

In step S57, the rewriting device 54 requests the ECUs 56 to terminate communications between the ECUs 56. In step S58, the ECUs 56 terminate communications between the ECUs 56.

In step S59, the rewriting device 54 rewrites the program for the target ECU 56*tar*.

Figure 11:
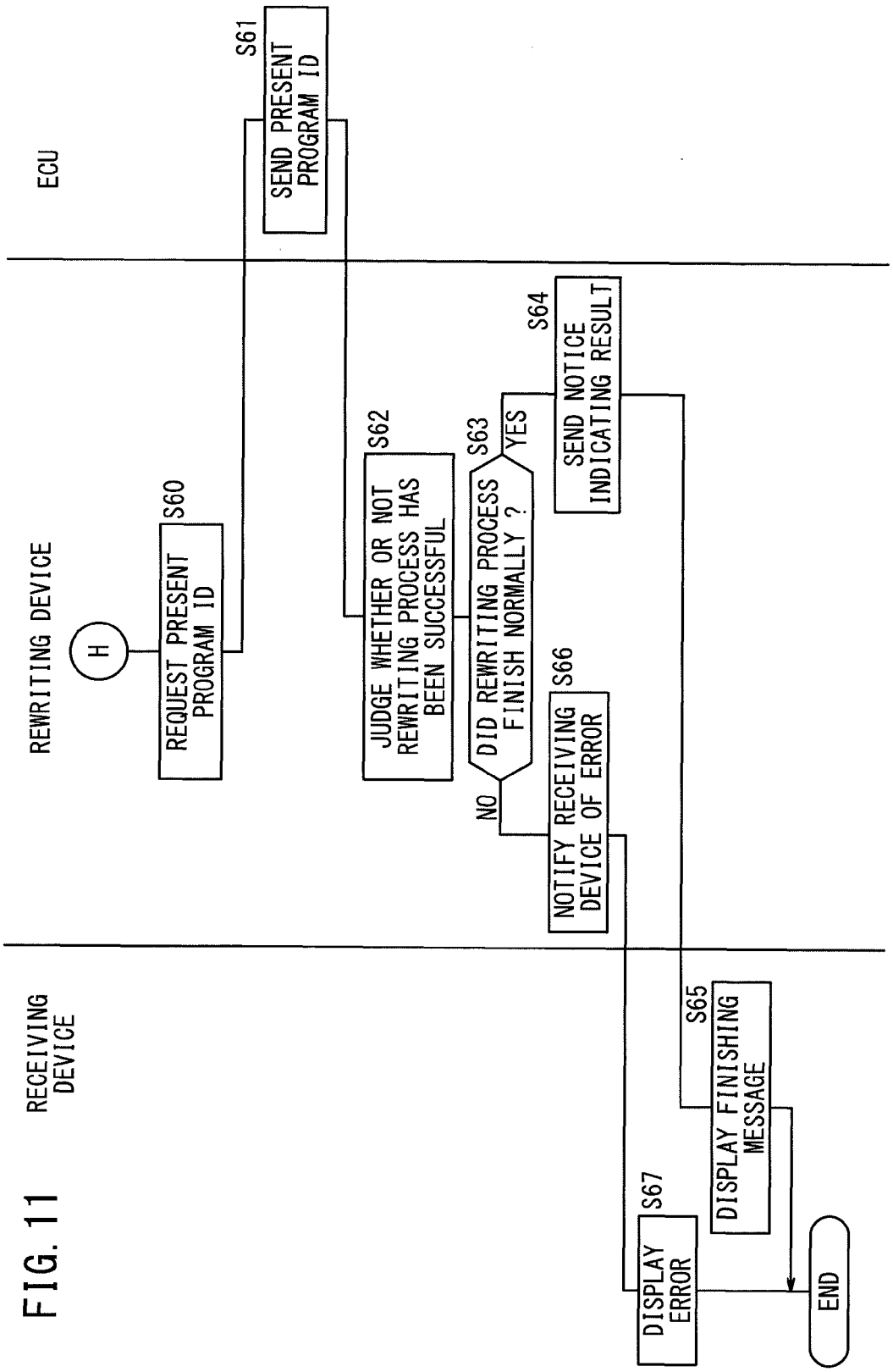
FIG. 11 is an eighth flowchart showing details of the processing sequence for rewriting a program for an ECU with rewriting data (program) transmitted through a CD-ROM.
Figure 12:
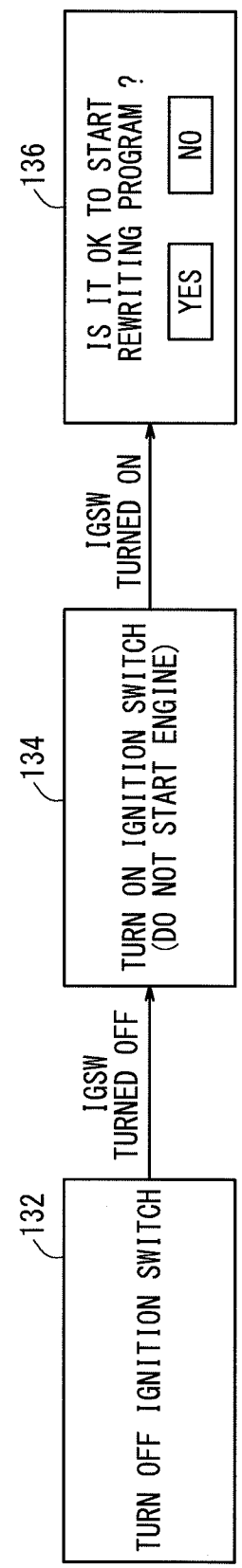
FIG. 12 is a screen transition diagram showing an example of screen transitions on a display unit, which correspond to portions of the flowcharts shown in FIGS. 8 and 9.

In step S60 of FIG. 11, after the rewriting device 54 has finished rewriting the program for the target ECU 56*tar*, the rewriting device 54 asks the target ECU 56*tar* for a program ID, which identifies certain content, such as the version of the present (i.e., rewritten) program.

In step S61, the target ECU 56*tar* sends the program ID of the present program to the rewriting device 54.

In step S62, the rewriting device 54 ascertains whether or not the rewriting process has been successful by confirming the program ID received from the target ECU 56*tar*. If the rewriting process has been successful and has finished normally (step S63: YES), then in step S64, the rewriting device 54 sends a notice to the receiving device 52 indicating that the rewriting process has finished normally, thereby ending the rewriting process.

In step S65, the receiving device 52 displays on the display unit 74 a message indicating that rewriting of the program has finished normally. The message may include an indication that rewriting of the program has finished, advice to turn off the IGSW 64, a code number (a specific numerical value or the like) representative of completion of program rewriting, advice to notify the manufacturer of the code number, and contact information concerning the manufacturer. By reading the message, the user can notify the manufacturer of the code number, thereby allowing the manufacturer to confirm that program rewriting has finished. The user can also notify the manufacturer of the code number by way of a telephone call, via electronic mail, or by way of an input screen on the manufacturer's homepage.

If the rewriting process has failed and did not finish normally (step S63: NO), then in step S66, the rewriting device 54 notifies the receiving device 52 of an error. In step S67, the receiving device 52 displays on the display unit 74 a message requesting the user to turn off the IGSW 64 and to contact the dealer. For example, the receiving device 52 displays on the display unit 74 the message "PROGRAM REWRITING FAILED. TURN OFF IGNITION SWITCH AND CONTACT DEALER".

Figure 13:
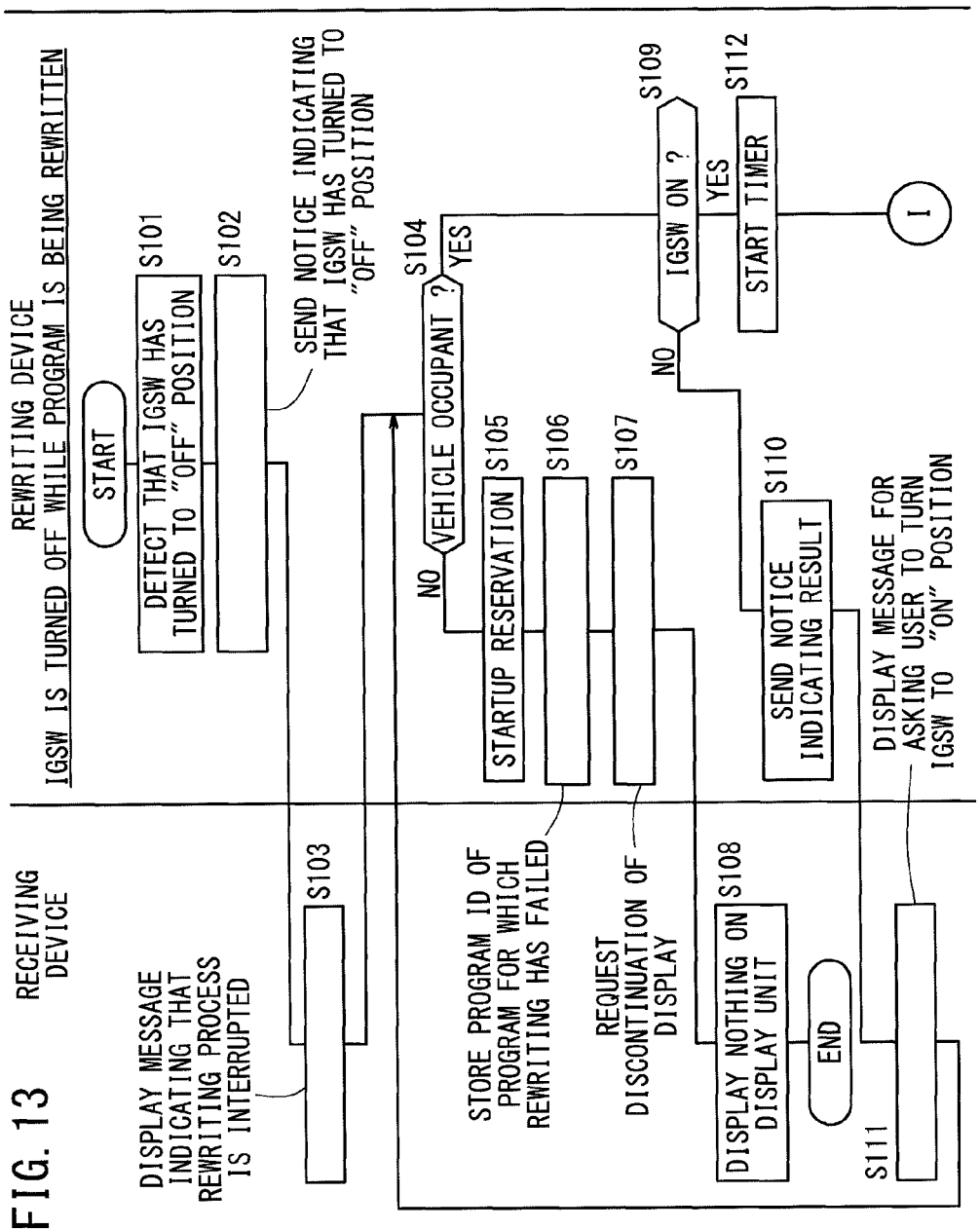
FIG. 13 is a first flowchart of a processing sequence that is executed when an IGSW is turned off while a program is being rewritten.
Figure 14:
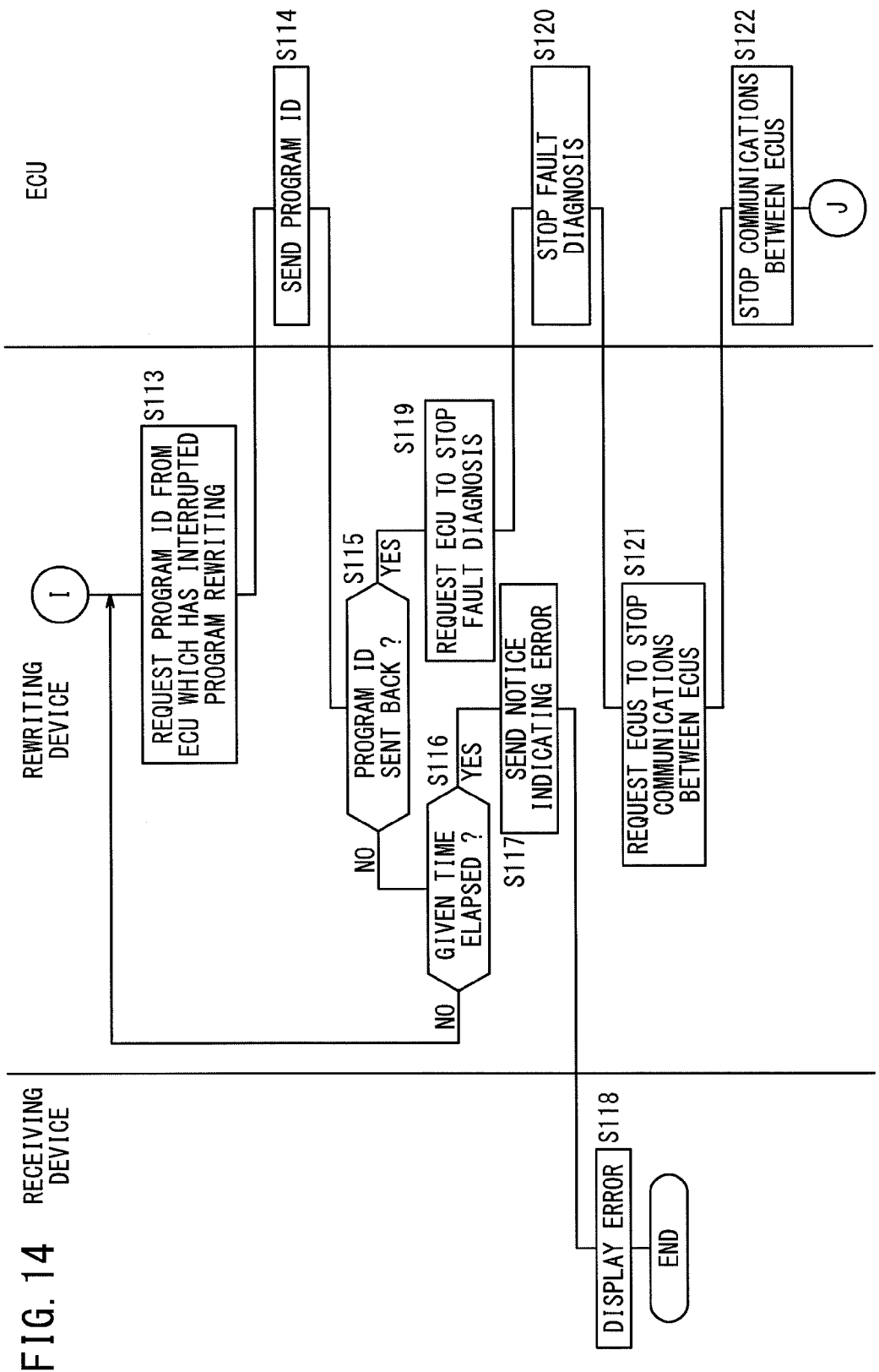
FIG. 14 is a second flowchart of the processing sequence that is executed when an IGSW is turned off while a program is being rewritten.
Figure 15:
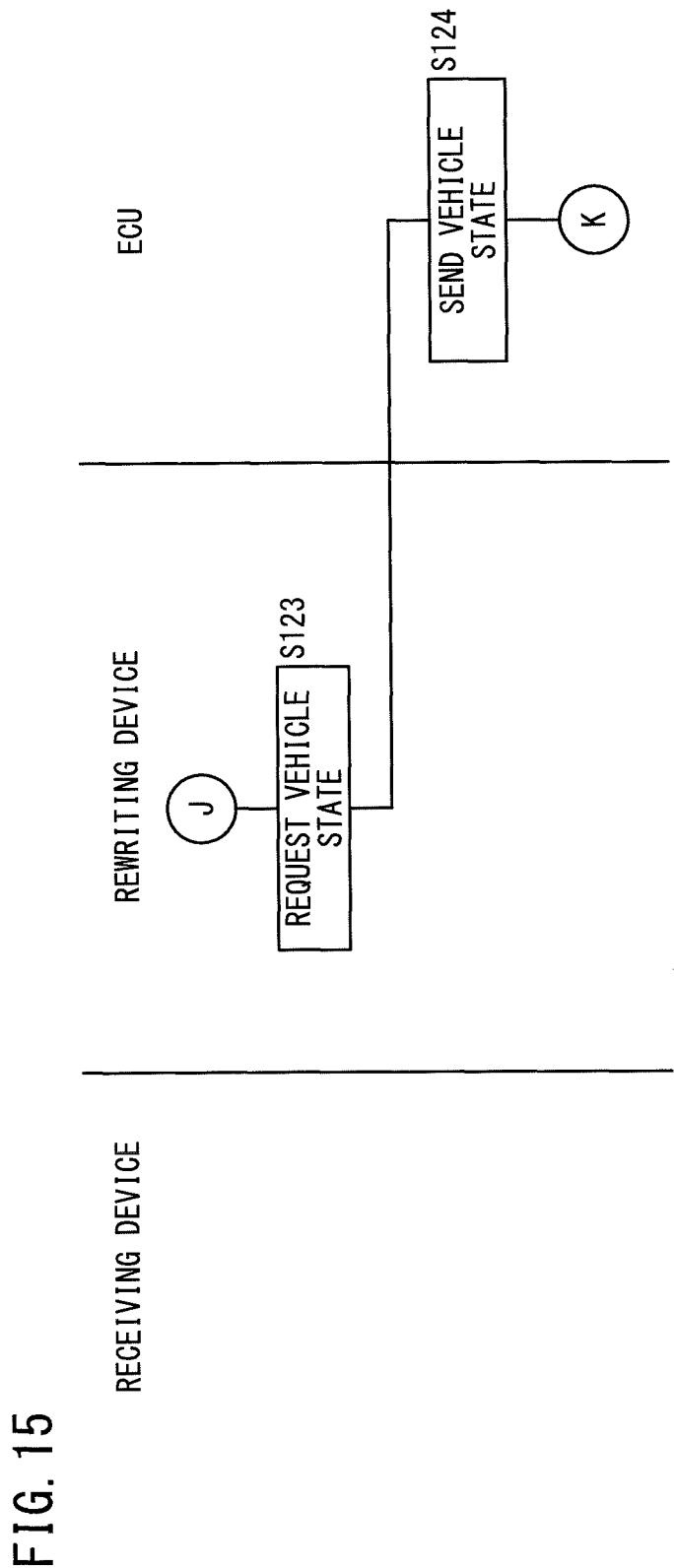
FIG. 15 is a third flowchart of the processing sequence that is executed when an IGSW is turned off while a program is being rewritten.
Figure 16:
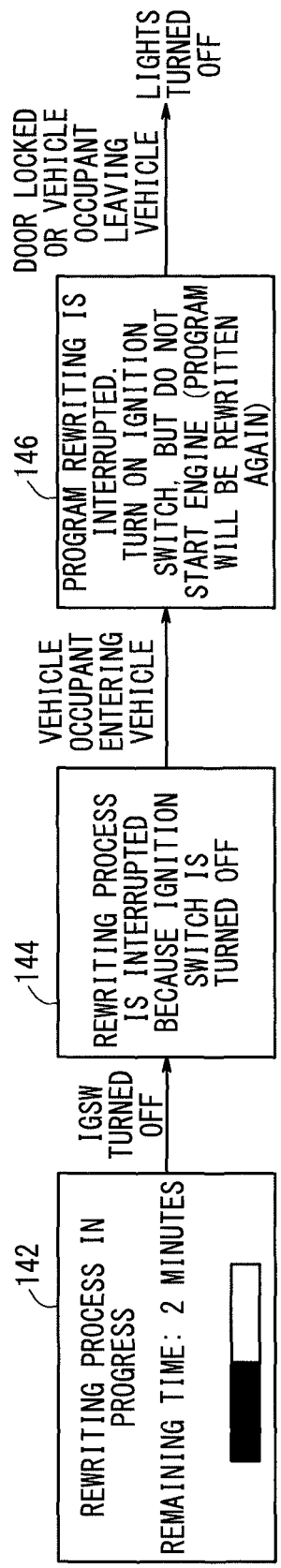
FIG. 16 is a screen transition diagram showing an example of screen transitions on the display unit, which correspond to a portion of the flowchart of FIG. 13.

(c) Processing Sequence Executed when IGSW 64 is Turned Off While Program is Being Rewritten:

FIGS. 13 through 15 show flowcharts of a processing sequence, which is executed when the IGSW 64 is turned off and while the program is being rewritten. FIG. 16 is a screen transition diagram showing an example of screen transitions on the display unit 74, which correspond to a portion of the flowchart of FIG. 13.

Although not shown in FIGS. 13 through 15, prior to starting to rewrite the program for the target ECU 56*tar* (step S59 in FIG. 10), the rewriting device 54 sends a startup signal Son to the receiving device 52, in order to ask the receiving device 52 to remain turned on even if the IGSW 64 is turned to the "OFF" position (step S38 in FIG. 8).

While the program is being rewritten, a message to the effect that the rewriting process is in progress and a remaining time are displayed, as indicated by the screen 142 shown in FIG. 16.

In step S101, if the user erroneously turns the IGSW 64 to the "OFF" position, the rewriting device 54 detects that the IGSW 64 has been turned to the "OFF" position, and in step S102, the rewriting device 54 sends a notice to the receiving device 52 indicating that the IGSW 64 has been turned to the "OFF" position. Since the receiving device 52 has already received the startup signal Son in advance, the receiving device 52 remains turned on, even though the IGSW 64 has been turned to the "OFF" position.

In step S103, after having received the notice indicating that the IGSW 64 has been turned to the "OFF" position, the receiving device 52 displays on the display unit 74 a message indicating that the rewriting process was interrupted because the IGSW 64 has been turned to the "OFF" position. The message may be represented by the phrase "REWRITING PROCESS INTERRUPTED BECAUSE IGNITION SWITCH IS TURNED OFF", for example, as indicated by the screen 144 shown in FIG. 16.

In step S104, the rewriting device 54 judges whether or not the user (vehicle occupant) is present in the vehicle 16 based on an output signal Sh from the door lock/vehicle occupant detecting unit 66. As described above, the output signal Sh represents an unlocked/locked state of the door lock 122 together with a detected value from the seat sensor 124, which acts as a pressure sensor. If the door lock 122 is activated and the detected value from the seat sensor 124 is nil, then the rewriting device 54 determines that the vehicle occupant is not present in the vehicle 16.

If the vehicle occupant is not present in the vehicle 16 (step S104: NO), then in step S105, the rewriting device 54 stores a subsequent startup reservation in the storage unit 96. The startup reservation is a setting for resuming rewriting of the program when the IGSW 64 is turned to the "ON" position at a subsequent time, and is represented by a flag. In step S106, the rewriting device 54 stores the program ID of the program for which rewriting has failed.

In step S107, the rewriting device 54 outputs a signal to the receiving device 52 requesting that the display on the display unit 74 be discontinued (cancellation request signal). When a vehicle occupant is not present in the vehicle 16, the content displayed on the display unit 74 is not seen. By not displaying anything on the display unit 74, it is possible to reduce electric power consumed by the display unit 74. The cancellation request signal may also include a request for turning off the receiving device 52. In step S108, in response to the cancellation request signal, the receiving device 52 discontinues display of content on the display unit 74, i.e., turns off the display unit 74.

If the vehicle occupant is present in the vehicle 16 (step S104: YES), then in step S109, the rewriting device 54 reads the position to which the IGSW 64 is turned, and determines the state of the IGSW 64. Alternatively, the rewriting device 54 may send a response request to a certain one or more of the ECUs 56 to thereby determine the state of the IGSW 64 based on whether or not a response is received. If there is a response from a certain one or more of the ECUs 56, then the rewriting device 54 determines that the IGSW 64 is turned on. If there is no response from a certain one or more of the ECUs 56, then the rewriting device 54 determines that the IGSW 64 is turned off.

If the IGSW 64 is turned off in step S109 (step S109: NO), then in step S110, the rewriting device 54 sends a notice to the receiving device 52 indicating that the IGSW 64 has been turned off.

In step S111, the receiving device 52 displays on the display unit 74 a message for requesting the user to return the IGSW 64 to the "ON" position. For example, the message may be represented by the phrase "PROGRAM REWRITING IS INTERRUPTED. TURN ON IGNITION SWITCH BUT DO NOT START ENGINE (PROGRAM WILL BE REWRITTEN AGAIN)", as indicated by the screen 146 shown in FIG. 16. After step S111, control returns to step S104.

If the IGSW 64 is turned on in step S109 (step S109: YES), then in step S112, the rewriting device 54 starts a timer (not shown).

In step S113 of FIG. 14, the rewriting device 54 requests a program ID from the ECU 56 that has interrupted rewriting of the program. If the ECU 56 to which the request has been sent is turned on, then in step S114, the ECU 56 sends the program ID to the rewriting device 54.

In step S115, the rewriting device 54 judges whether or not the program ID has been sent back and received. If the program ID has not been sent back and received (step S115: NO), then in step S116, the rewriting device 54 judges whether a given period of time (e.g., 5 seconds) has elapsed.

If the given period of time has not elapsed (step S116: NO), then control returns to step S113. If the given period of time has elapsed (step S116: YES), then in step S117, in order to avoid an infinite loop, the rewriting device 54 sends a notice concerning elapse of the given time (error) to the receiving device 52. In step S118, the receiving device 52 displays on the display unit 74 a message asking the user to turn off the IGSW 64 and to contact the dealer. For example, the receiving device 52 displays on the display unit 74 the message "PROGRAM REWRITING FAILED. TURN OFF IGNITION SWITCH AND CONTACT DEALER".

If the program ID has been sent back (step S115: YES), then steps S119 through S122, which are the same as steps S55 through S58 of FIG. 10, are carried out. Then, steps S123, S124 (FIG. 15), which are the same as steps S44, S45 of FIG. 9, are carried out. Thereafter, control proceeds to step S46 of FIG. 9.

Figure 17:
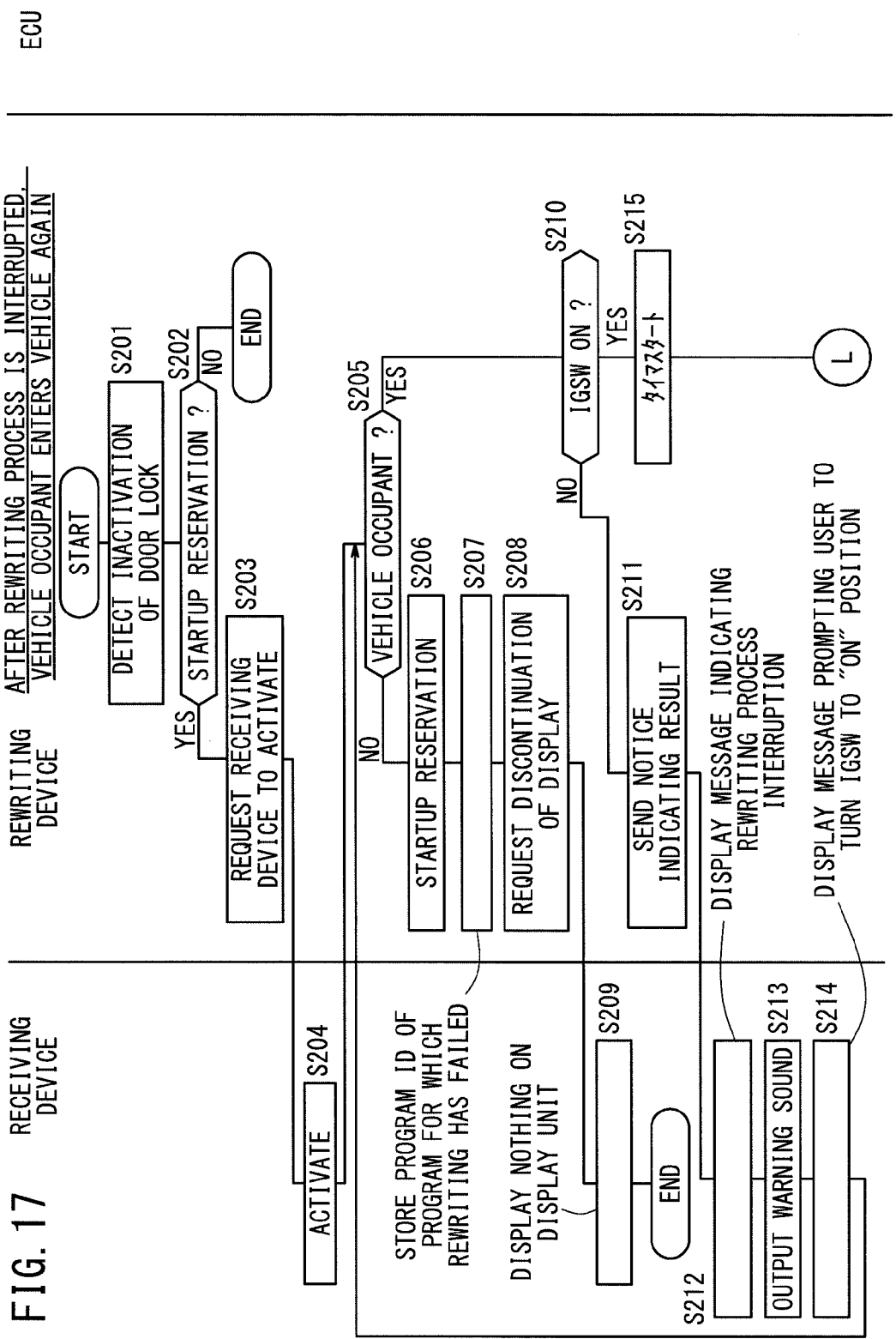
FIG. 17 is a first flowchart of a processing sequence, which is executed when an IGSW is turned off while a program is being rewritten, and when the user (vehicle occupant) reenters the vehicle after having left the vehicle.
Figure 18:
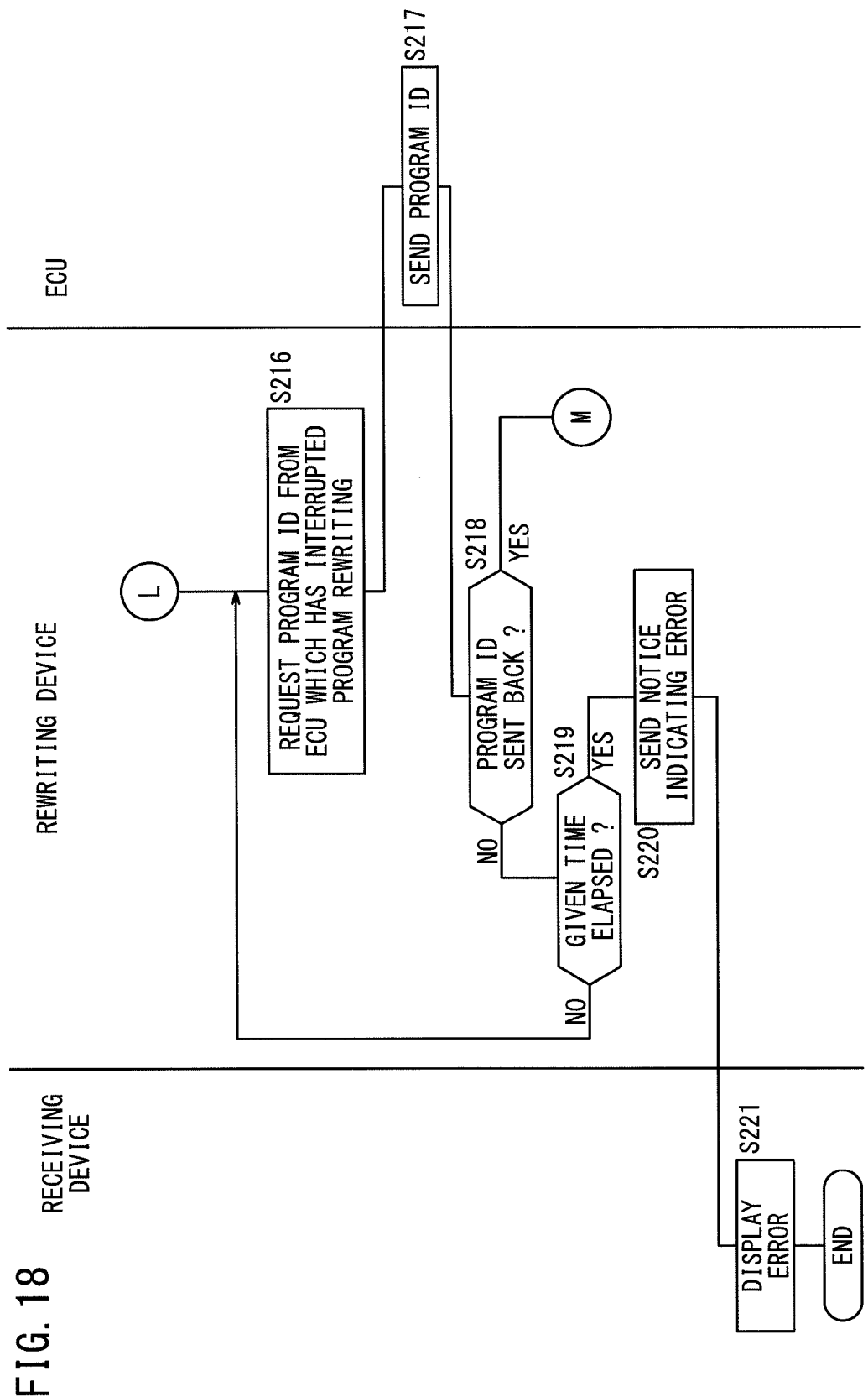
FIG. 18 is a second flowchart of a processing sequence, which is executed when an IGSW is turned off while a program is being rewritten, and when the user (vehicle occupant) reenters the vehicle after having left the vehicle.
Figure 19:
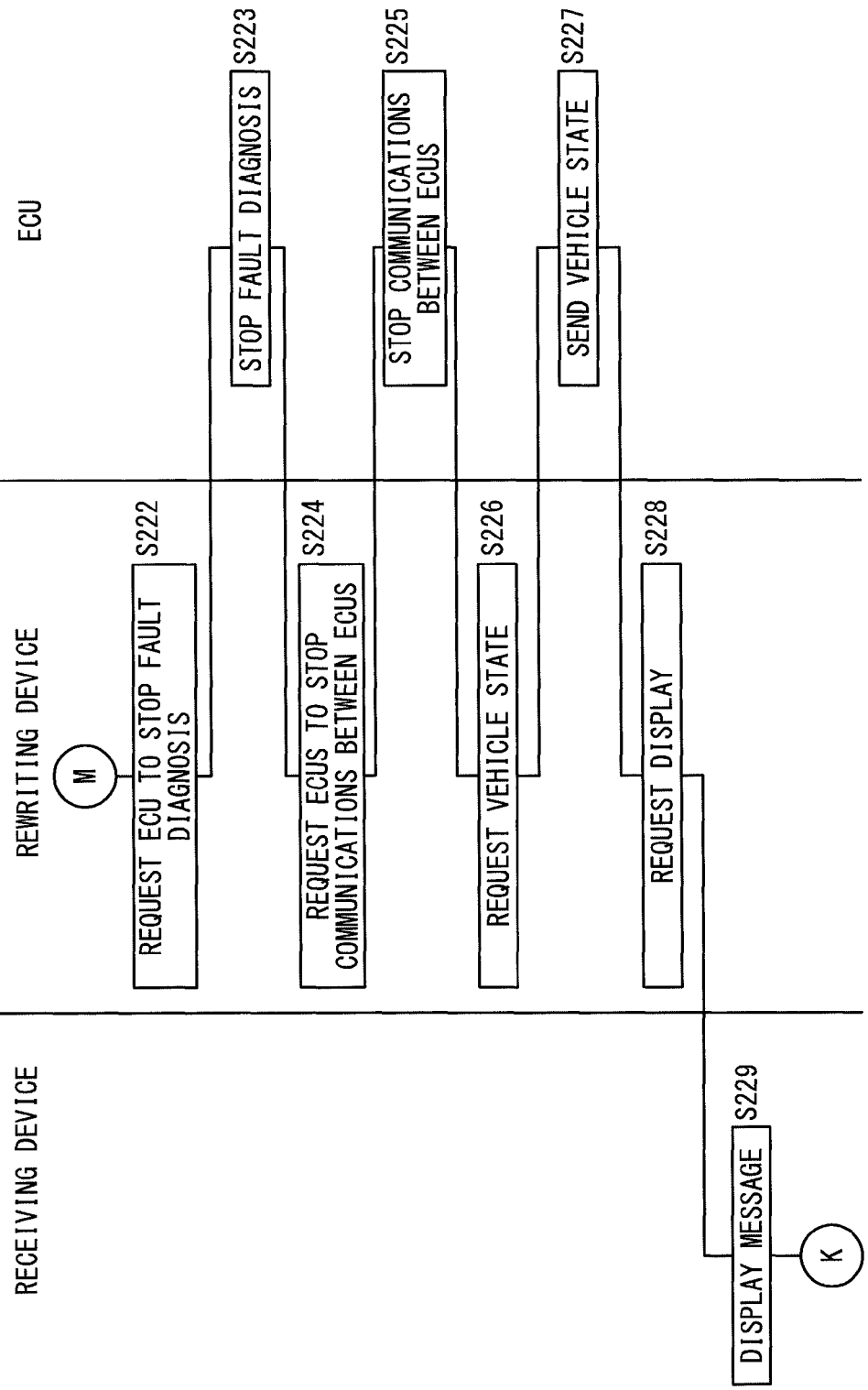
FIG. 19 is a third flowchart of a processing sequence, which is executed when an IGSW is turned off while a program is being rewritten, and when the user (vehicle occupant) reenters the vehicle after having left the vehicle.
Figure 20:
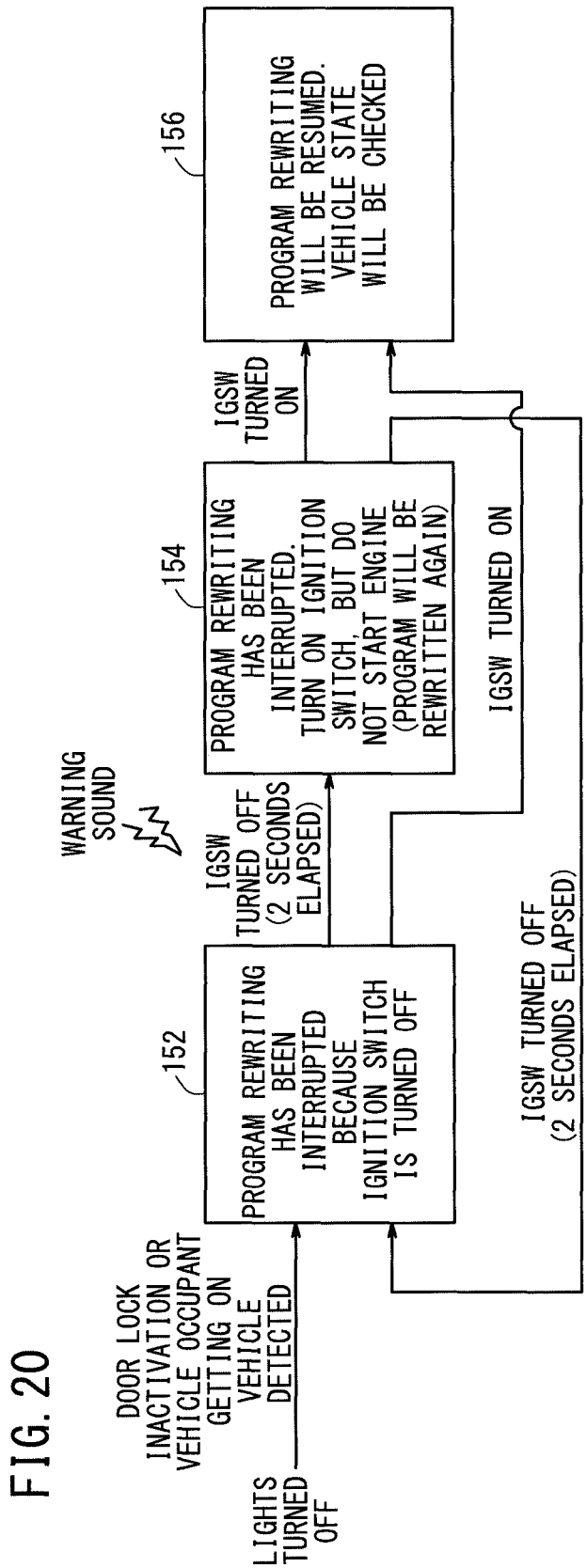
FIG. 20 is a screen transition diagram showing an example of screen transitions on the display unit, which correspond to portions of the flowcharts shown in FIGS. 17 through 19.

(d) Processing Sequence Executed when IGSW 64 is Turned Off, the User (Vehicle Occupant) Leaves the Vehicle 16, and Thereafter, the User Reenters the Vehicle 16:

FIGS. 17 through 19 are flowcharts of a processing sequence, which is executed when the IGSW 64 is turned off while the program is being rewritten, and then, after the user (vehicle occupant) has left the vehicle, the user reenters the vehicle. FIG. 20 is a screen transition diagram showing an example of screen transitions on the display unit 74, which correspond to portions of the flowcharts shown in FIGS. 17 through 19.

In step S201, if the door lock 122 is inactivated, the door lock/vehicle occupant detecting unit 66 sends an output signal Sh indicating that the door lock 122 is inactivated to the rewriting device 54, which detects and confirms inactivation of the door lock 122.

In step S202, the rewriting device 54 judges whether or not there is a next startup reservation (step S105 of FIG. 13). If there is not a next startup reservation (step S202: NO), the present processing sequence is brought to an end. If there is a next startup reservation (step S202: YES), then in step S203, the rewriting device 54 sends a startup signal Son to the receiving device 52, thereby requesting the receiving device 52 to be activated (to be turned on). In step S204, the receiving device 52 is activated.

Steps S205 through S211 are the same as steps S104 through S110 of FIG. 13. However, after the door lock 122 has been inactivated, a certain amount of time, which is required for the user to enter the vehicle 16, should be taken into account.

In step S212, the receiving device 52 displays on the display unit 74 a message indicating that the rewriting process has been interrupted because the IGSW 64 has been turned to the "OFF" position. The message may be represented by the phrase "PROGRAM REWRITING HAS BEEN INTERRUPTED BECAUSE IGNITION SWITCH IS TURNED OFF", for example, as indicated by the screen 152 shown in FIG. 20.

In step S213, the receiving device 52 outputs a warning sound.

In step S214, the receiving device 52 displays on the display unit 74 a message prompting the user to turn the IGSW 64 to the "ON" position. The message may be represented by the phrase "PROGRAM REWRITING HAS BEEN INTERRUPTED. TURN IGNITION SWITCH ON BUT DO NOT START ENGINE (PROGRAM WILL BE REWRITTEN AGAIN)", for example, as indicated by the screen 154 shown in FIG. 20. After step S214, control returns to step S205.

If the IGSW 64 is turned on in step S210 (step S210: YES), steps S215 through S229 of FIGS. 17 through 19 are carried out. Steps S215 through steps S221 are the same as steps S112 through S118 of FIGS. 13 and 14. Steps S222 through S225 are the same as steps S55 through S58 of FIG. 10. Steps S226, S227 are the same as steps S44, S45 of FIG. 9.

In step S228, the rewriting device 54 requests that the receiving device 52 display a message to the effect that rewriting of the program will be resumed, and that the state of the vehicle 16 will be checked for resumption of program rewriting. In step S229, the receiving device 52 displays such a message on the display unit 74. The message may be represented by the phrase "PROGRAM REWRITING WILL BE RESUMED. VEHICLE STATE WILL BE CHECKED", for example, as indicated by the screen 156 shown in FIG. 20. Step S229 is followed by step S46 of FIG. 9.

Figure 21:
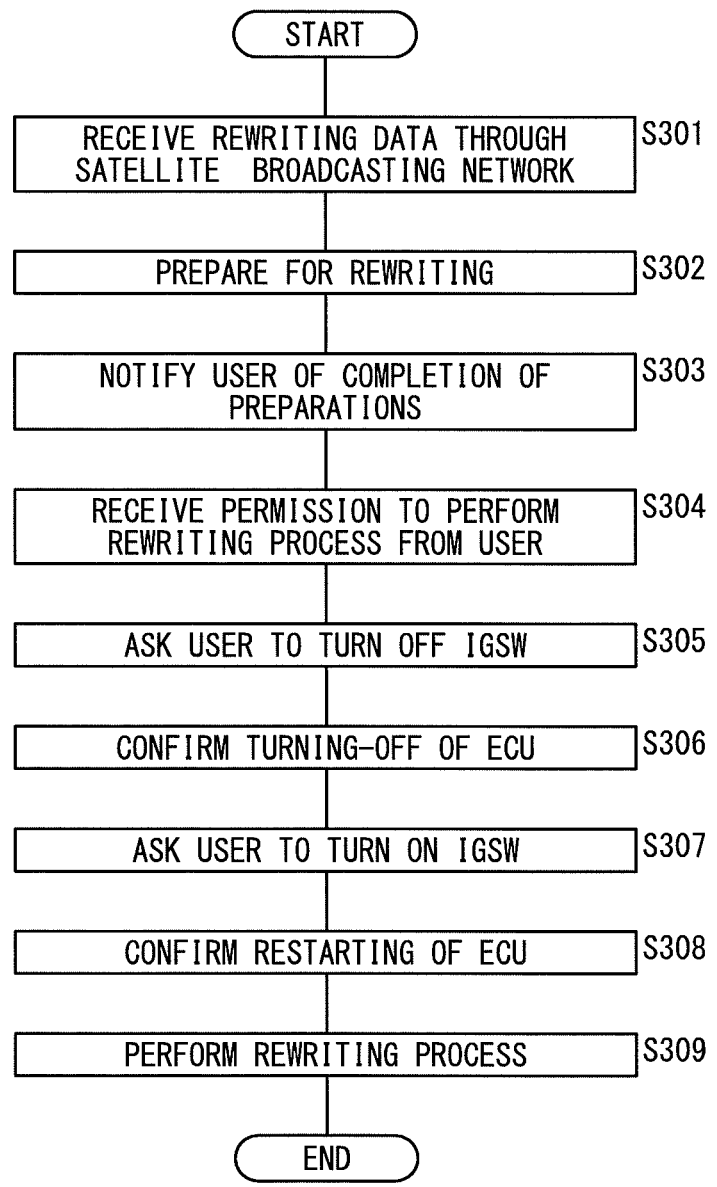
FIG. 21 is a flowchart of a general outline of a processing sequence for rewriting a program for an ECU with rewriting data (program) transmitted through a satellite broadcasting network.

(2) Program Transmitted Through Satellite Broadcasting Network 24:

(a) Outline of Rewriting Process:

FIG. 21 is a flowchart of a general outline of a processing sequence for rewriting a program for an ECU 56 with rewriting data (program) transmitted through the satellite broadcasting network 24.

In step S301, the receiving device 52 receives rewriting data (program) transmitted through the satellite broadcasting network 24.

Steps S302 through S309 are the same as steps S2 through S9 of FIG. 3.

During steps S301 through S305, the vehicle 16 is capable of being driven. During steps S306 through S309, the engine is shut off and hence the vehicle 16 cannot be driven.

Figure 22:
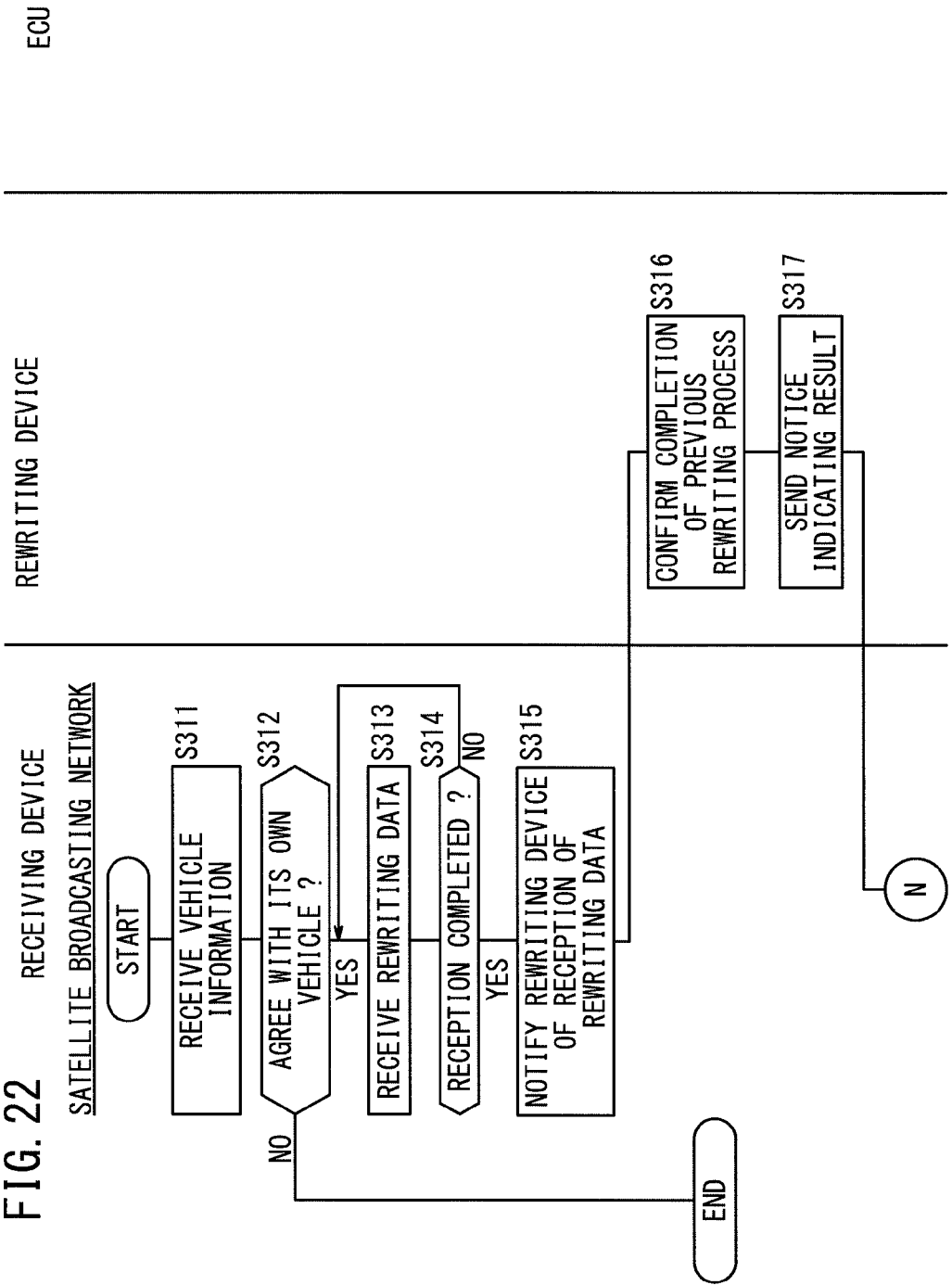
FIG. 22 is a first flowchart showing details of the processing sequence for rewriting a program for an ECU with rewriting data (program) transmitted through a satellite broadcasting network.
Figure 23:
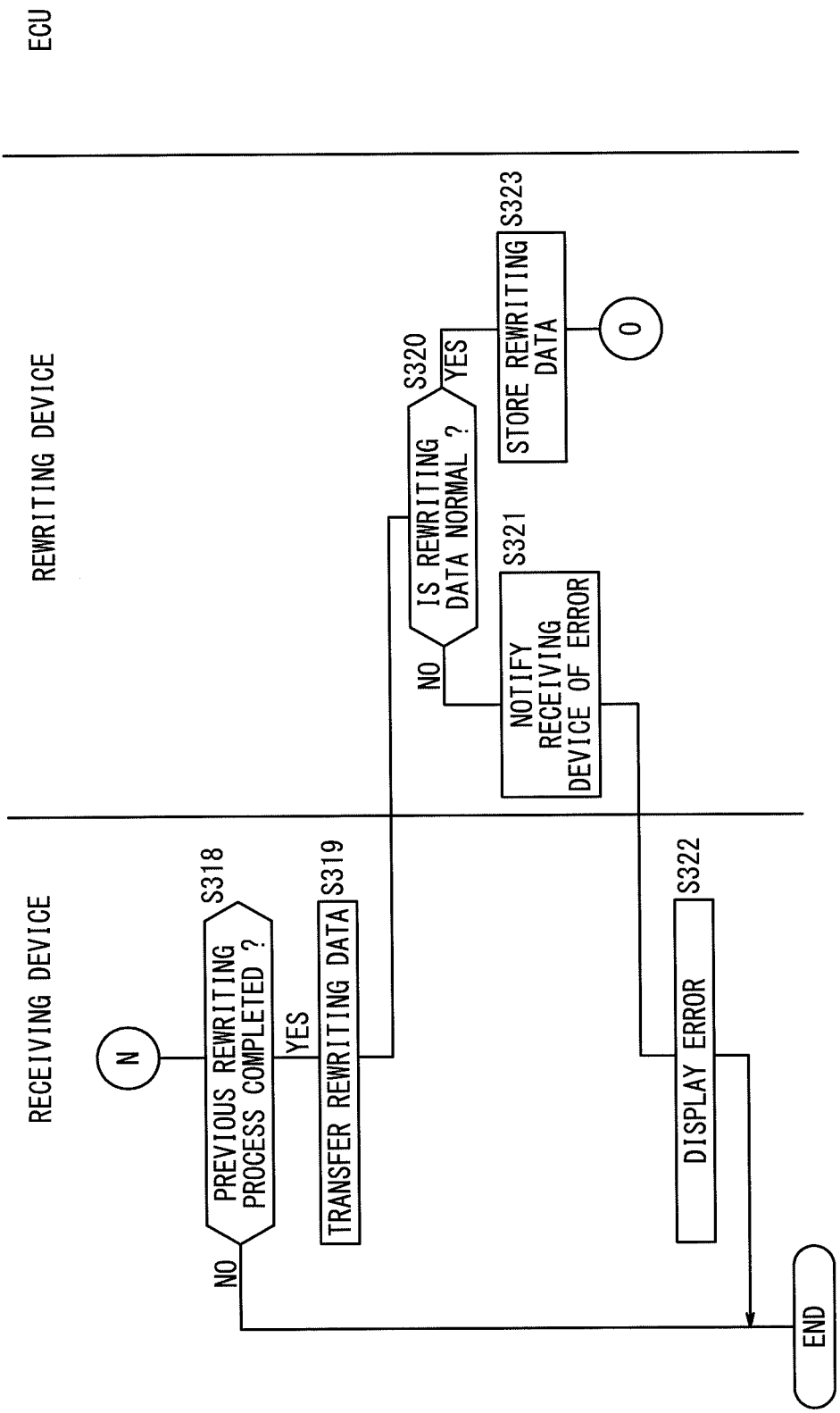
FIG. 23 is a second flowchart showing details of the processing sequence for rewriting a program for an ECU with rewriting data (program) transmitted through a satellite broadcasting network.
Figure 24:
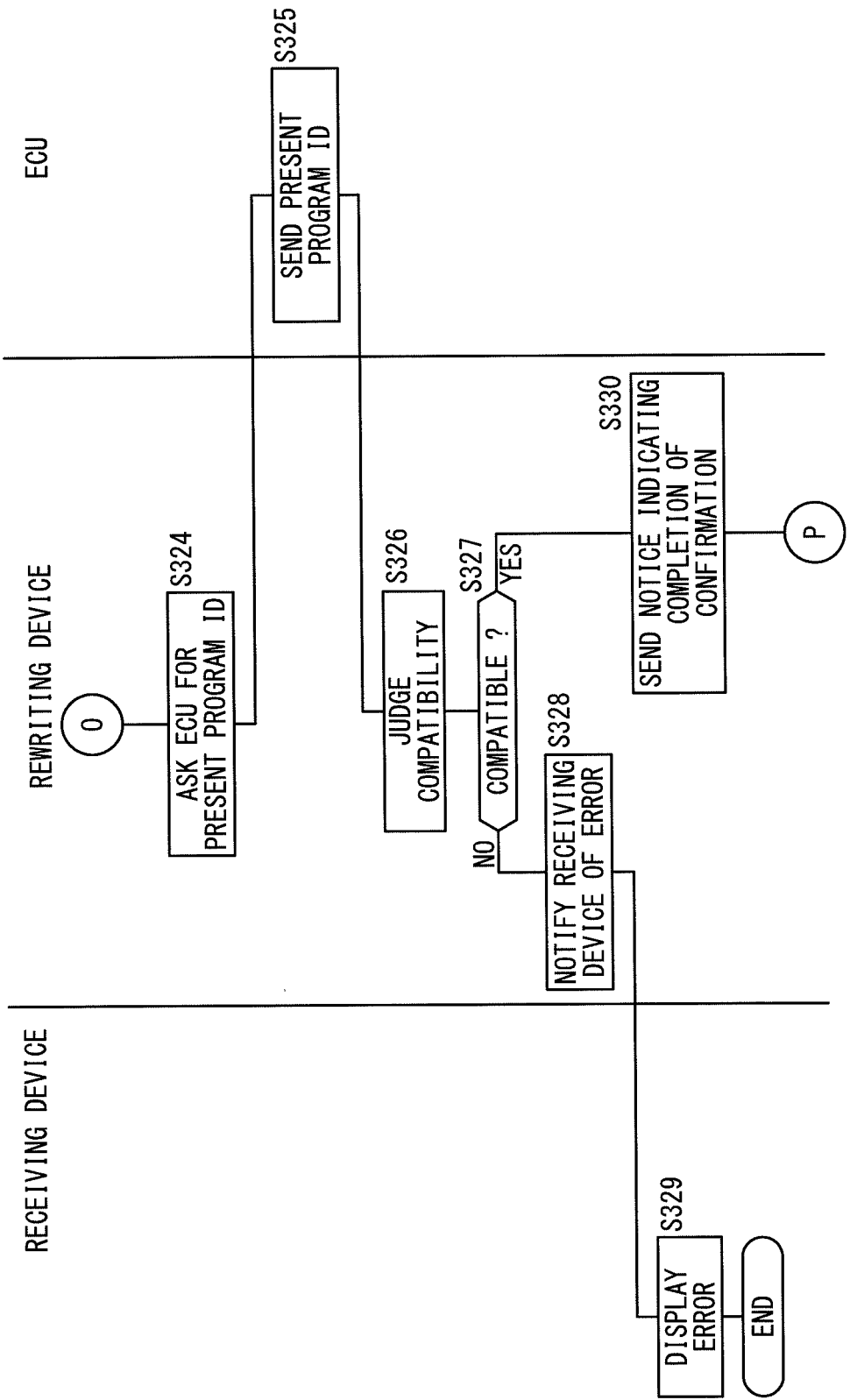
FIG. 24 is a third flowchart showing details of the processing sequence for rewriting a program for an ECU with rewriting data (program) transmitted through a satellite broadcasting network.

(b) Details of Rewriting Process:

FIGS. 22 through 24 are flowcharts showing details of a processing sequence for rewriting the program for the ECU 56 with rewriting data (program) transmitted through the satellite broadcasting network 24. Processing details, which share common processing details (FIGS. 4 through 11) concerning rewriting of the program with the rewriting data (program) transmitted through the CD-ROM 22, will be described with reference to FIGS. 4 through 11.

Steps S311 through S314 correspond to step S301 of FIG. 21.

In step S311, the receiving device 52 receives vehicle information through the satellite broadcasting network 24. More specifically, upon the server 14 sending vehicle information via a non-illustrated broadcasting station, the vehicle information is relayed by the broadcasting satellite 28, and then the vehicle information is received by the wireless antenna 82 of the receiving device 52. The vehicle information, which is received by the wireless antenna 82, is demodulated by the modem 84 and output to the processor 78.

In step S312, the receiving device 52 judges whether or not the received vehicle information agrees with the vehicle 16 (the vehicle per se) or not. If the received vehicle information agrees with the vehicle 16 (step S312: YES), then control proceeds to step S313. If the received vehicle information does not agree with the vehicle 16 (step S312: NO), then the present processing sequence is brought to an end.

In step S313, the receiving device 52 receives the rewriting data (program) transmitted through the satellite broadcasting network 24. The specific process of receiving the rewriting data (program) is the same as the process described in step S311. The content of the rewriting data (program) is the same as that of the CD-ROM 22 (FIGS. 4 through 11).

In step S314, the receiving device 52 judges whether or not reception of the rewriting data (program) is completed. If reception of the rewriting data (program) is not completed (step S314: NO), then control returns to step S313. If reception of the rewriting data (program) is completed (step S314: YES), then control proceeds to step S315.

In step S315, the receiving device 52 sends a notice to the rewriting device 54 indicating reception of the rewriting data (program).

Figure 4:
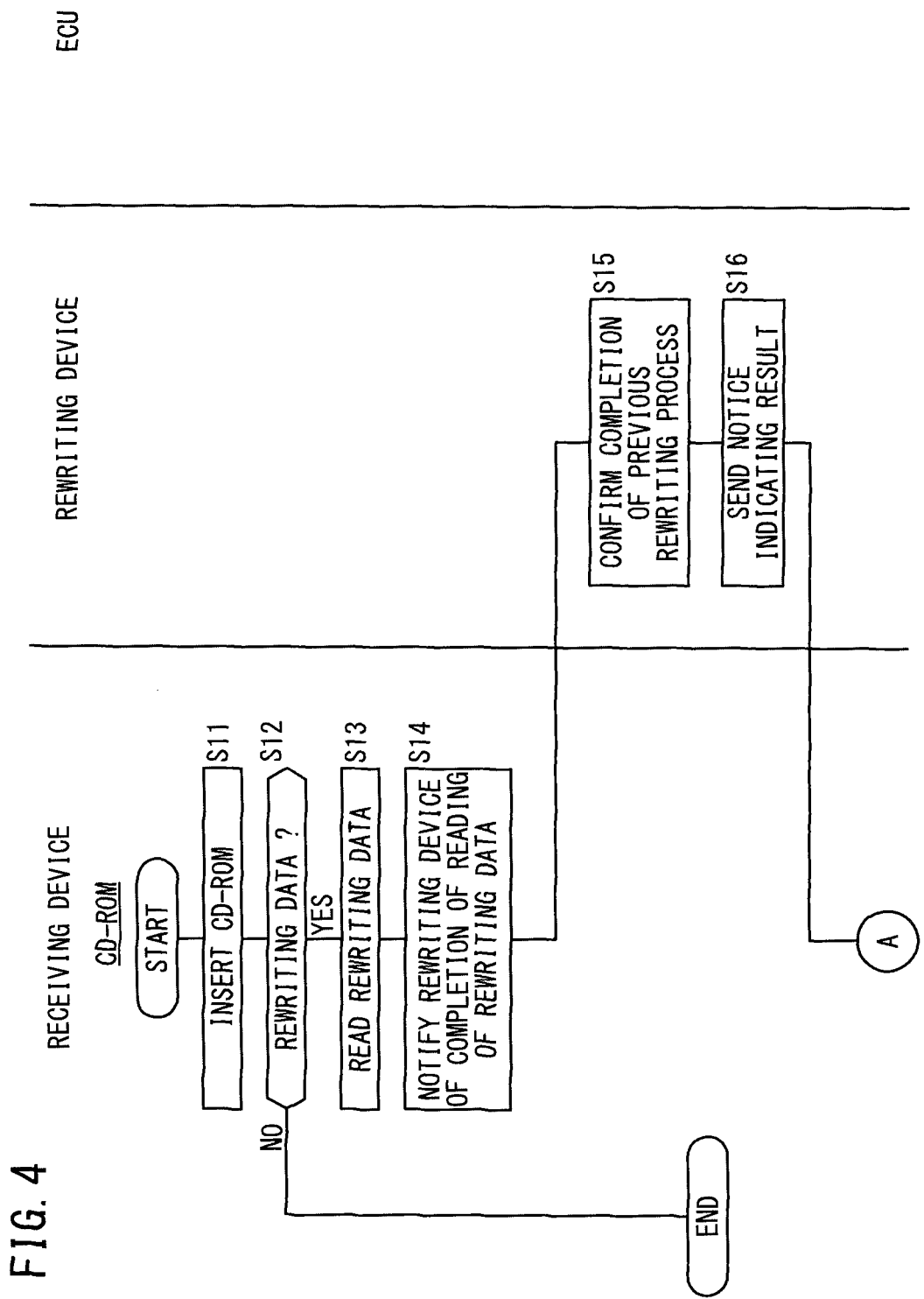
FIG. 4 is a first flowchart showing details of the processing sequence for rewriting a program for an ECU with rewriting data (program) transmitted through a CD-ROM.
Figure 6:
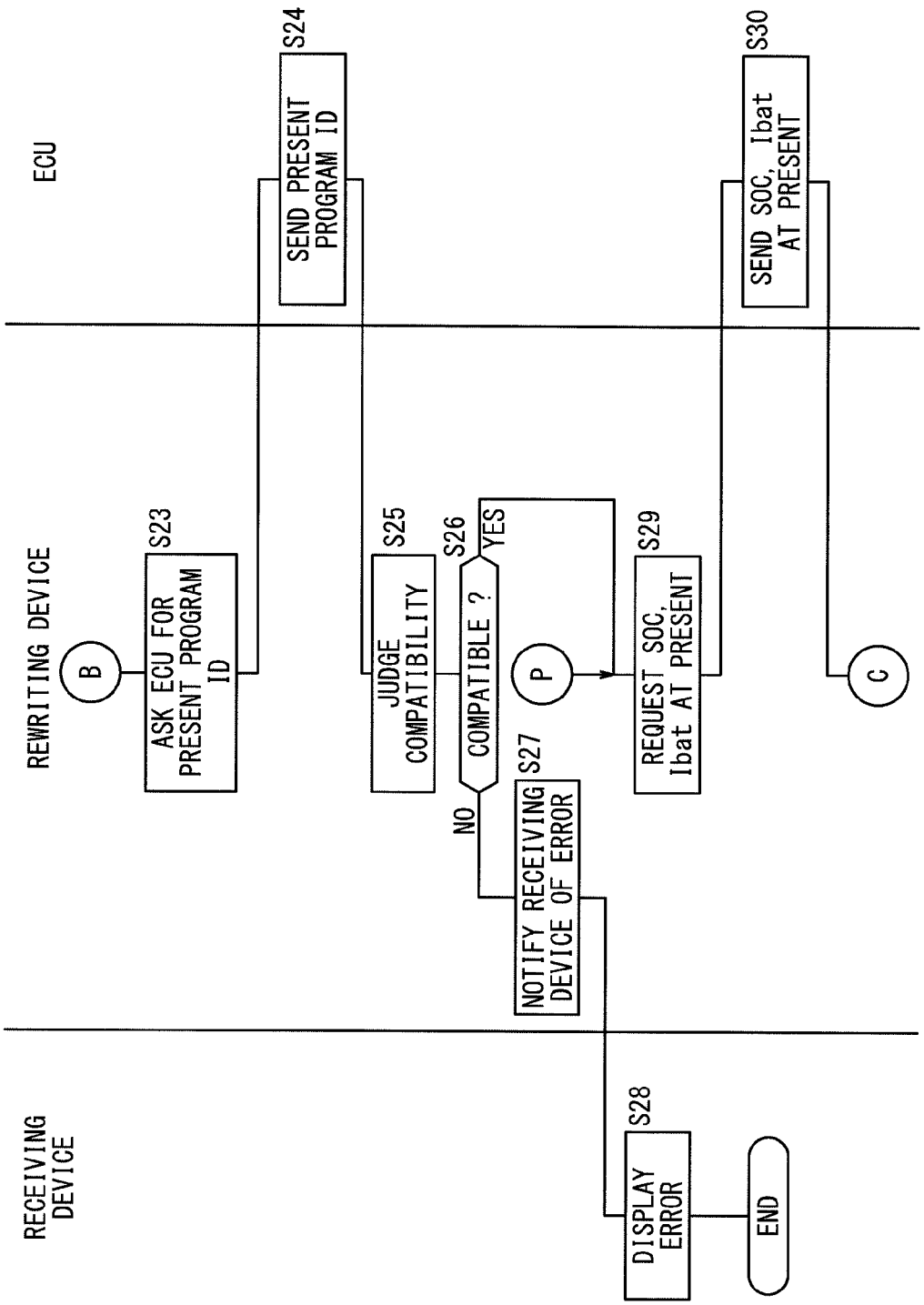
FIG. 6 is a third flowchart showing details of the processing sequence for rewriting a program for an ECU with rewriting data (program) transmitted through a CD-ROM.

Steps S316 through S329 of FIGS. 22 through 24 are the same as steps S15 through S28 of FIGS. 4 through 6. If the rewriting data (program) are compatible with the target ECU 56tar (step S327: YES), then in step S330, the rewriting device 54 sends a notice to the receiving device 52 indicating that confirmation of compatibility is finished. Thereafter, control proceeds to step S29 of FIG. 9.

Figure 25:
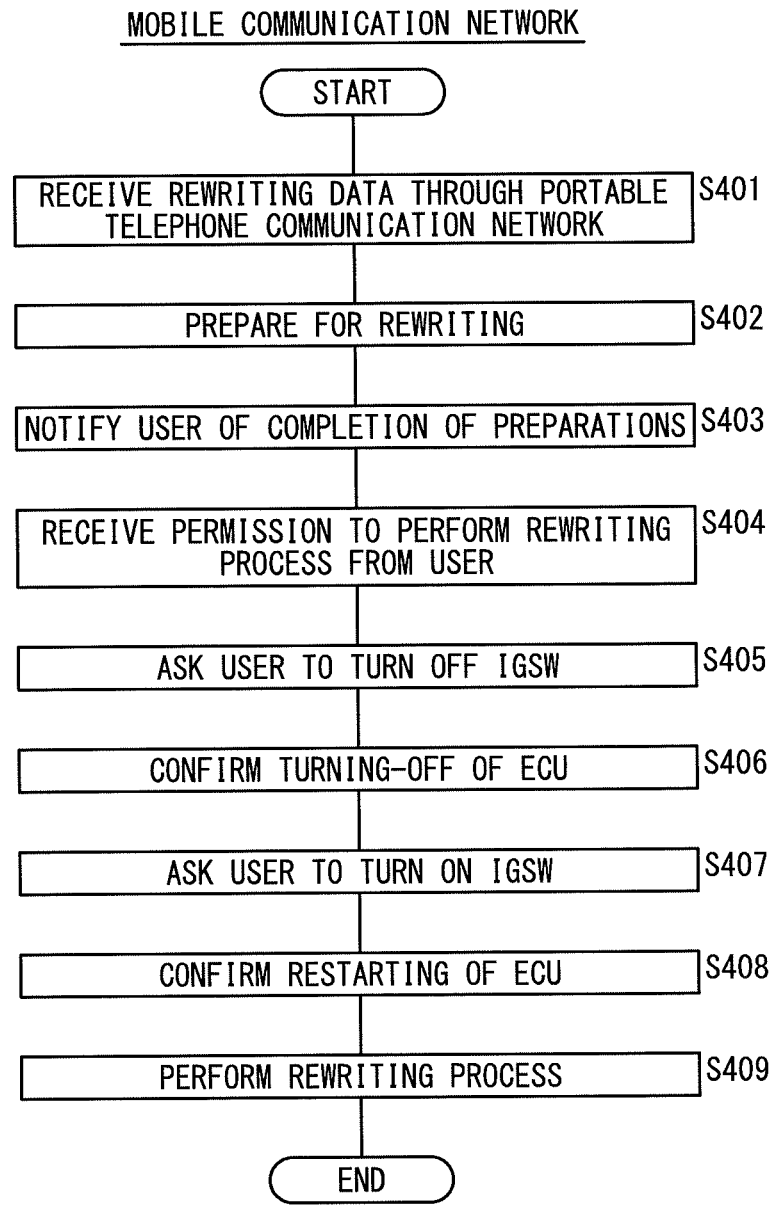
FIG. 25 is a flowchart of a general outline of a processing sequence for rewriting a program for an ECU with rewriting data (program) transmitted through a mobile communications network.

(3) Program Transmitted Through Mobile Communications Network 26:

(a) Outline of Rewriting Process:

FIG. 25 is a flowchart of a general outline of a processing sequence for rewriting the program for an ECU 56 with rewriting data (program) transmitted through the mobile communications network 26.

In step S401, the receiving device 52 receives rewriting data (program), which is transmitted through the mobile communications network 26. For receiving the rewriting data (program) through the mobile communications network 26, the portable telephone 86 should be connected in advance to the connector 88.

Steps S402 through S409 are the same as steps S2 through S9 of FIG. 3 and steps S302 through S309 of FIG. 21.

During steps S401 through S405, the vehicle 16 is capable of being driven. During steps S406 through S409, the engine is shut off and hence the vehicle 16 cannot be driven.

Figure 26:
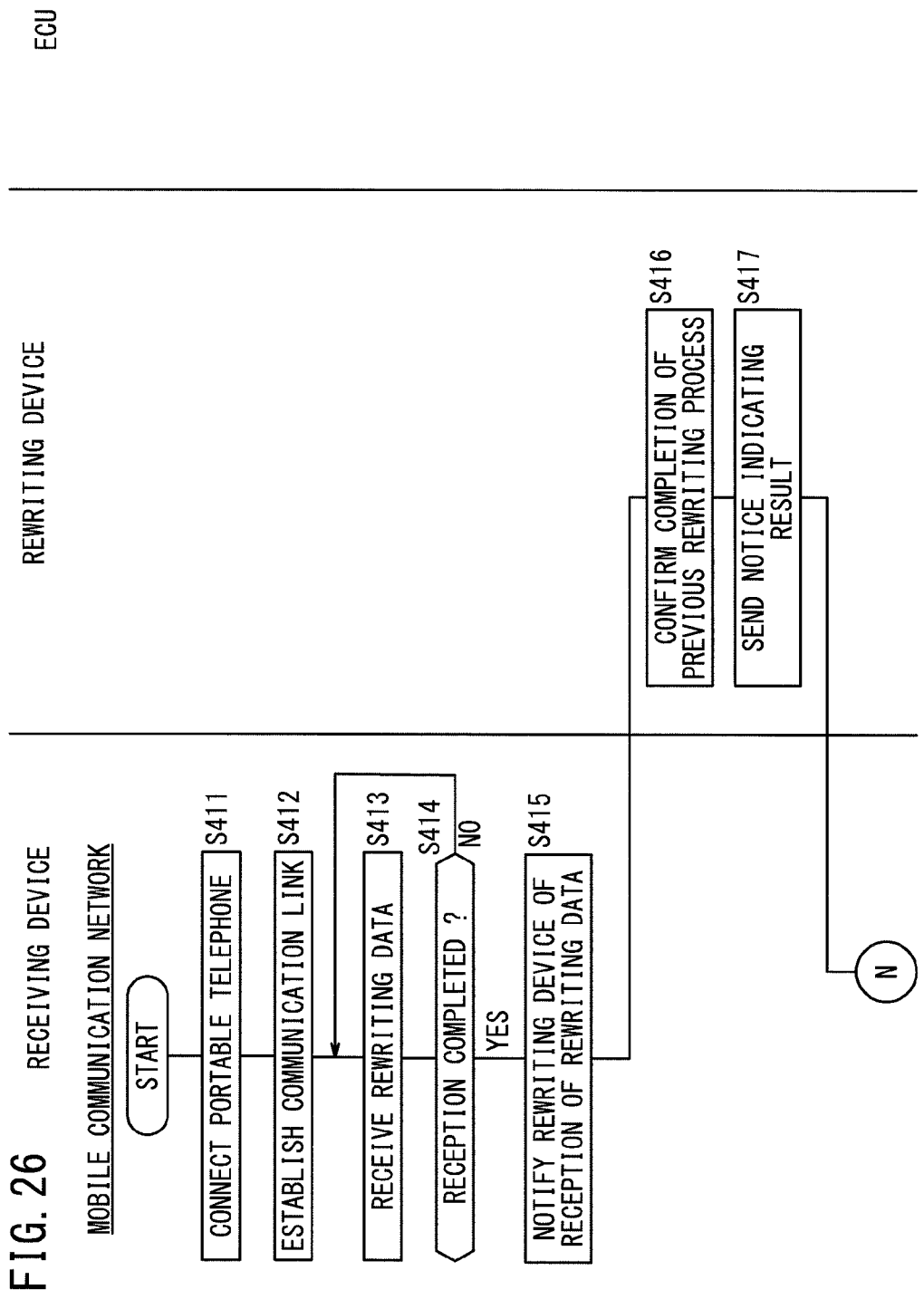
FIG. 26 is a flowchart showing details of the processing sequence for rewriting a program for an ECU with rewriting data (program) transmitted through a mobile communications network.

(b) Details of Rewriting Process:

FIG. 26 is a flowchart showing details of a processing sequence for rewriting the program for the ECU 56 with rewriting data (program) transmitted through the mobile communications network 26. Processing details, which share common processing details (see FIGS. 22 through 24) concerning rewriting of the program with rewriting data (program) transmitted through the satellite broadcasting network 24, will be described with reference to FIGS. 22 through 24.

In step S411, the user connects the portable telephone 86 to the connector 88.

In step S412, the portable telephone 86 of the receiving device 52 establishes a communication link with the server 14. Such a communication link is established when rewriting data (program) are transferred from the server 14. Alternatively, the receiving device 52 may send an inquiry to the server 14 via the portable telephone 86 and the mobile communications network 26, requesting whether or not there are new rewriting data (program) at a preset time (e.g., when the portable telephone 86 and the connector 88 are connected to each other, or at a given interval from, or at a given time after connection between the portable telephone 86 and the connector 88 is established).

Steps S413 through S417 are the same as steps S313 through 317 of FIG. 22. Thereafter, control proceeds to step S318 of FIG. 23.

4. Advantages of the Present Embodiment

According to the embodiment described above, it is judged whether or not the vehicle 16 can be restarted based on a predicted state of the battery 58 after a program for the ECU 56 is rewritten, and the program is rewritten only if the vehicle 16 is capable of being restarted. Accordingly, the vehicle 16 can reliably be restarted after the program has been rewritten.

According to the present embodiment, the rewriting device 54 changes the threshold value THsoc depending on the ambient temperature Tc [° C.] in the vicinity of the vehicle 16, the engine coolant water temperature Tw [° C.] of the vehicle 16, and the internal resistance R [Ω] of the battery 58. Conditions for restarting the vehicle 16 can thus be established more appropriately.

In the present embodiment, the rewriting device 54 predicts the SOC after the program is rewritten based on the SOC and the battery current Ibat at the time that the program starts to be rewritten, and an expected processing time Tre for rewriting the program. If the predicted SOC is greater than the threshold value THsoc, the program is rewritten. Therefore, a charged state of the battery 58 after the program has been rewritten can easily be predicted and used.

Figure 27:
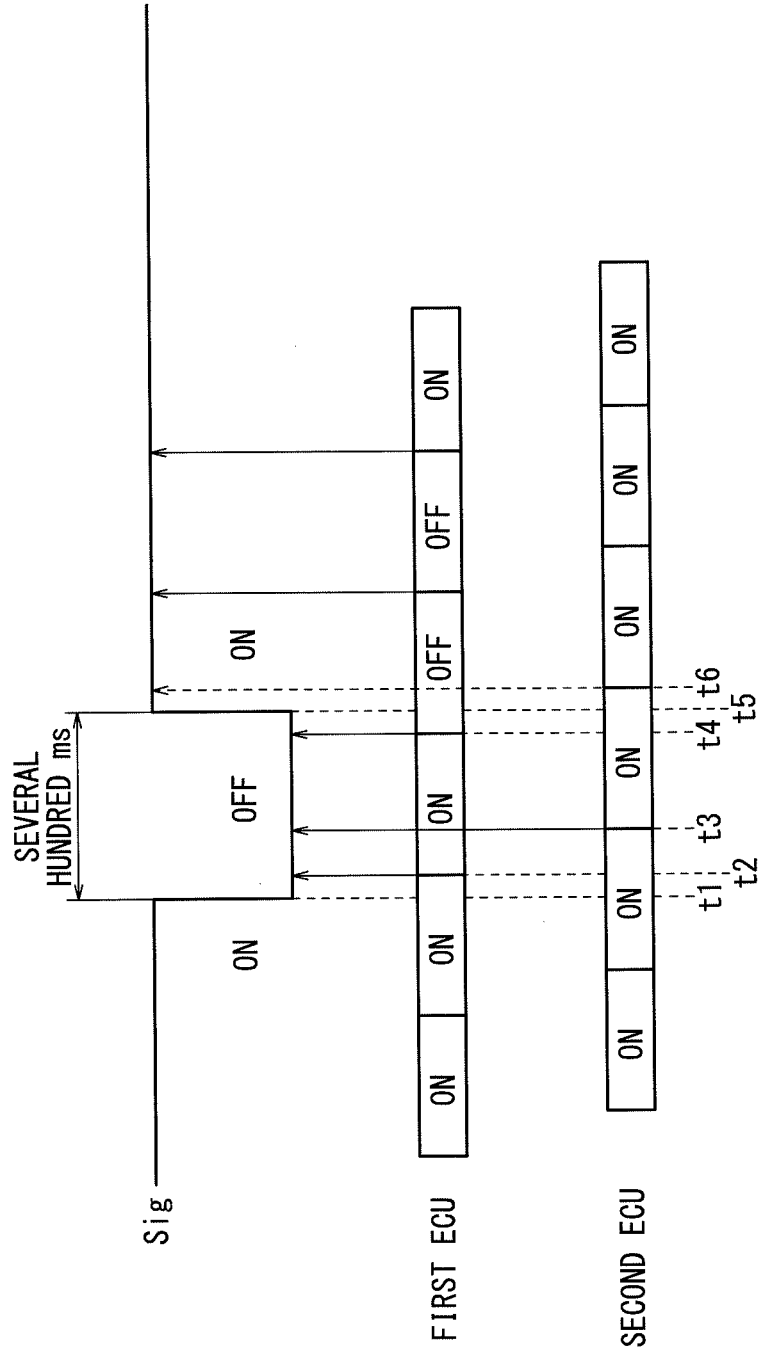
FIG. 27 is a diagram showing the relationship between an output signal from the IGSW and recognition of ECUs.

According to the present embodiment, in the situation shown in FIG. 27, it is possible to reliably turn off the ECU 56 before the program is rewritten.

FIG. 27 is a diagram showing the relationship between an output signal Sig from the IGSW 64 and recognition of the ECUs 56. In FIG. 27, after the IGSW 64 has been turned from the "ON" position to the "OFF" position at time t1, the IGSW 64 is turned to the "ON" position at time t5. The period from time t1 to time t5 is very short, e.g., several hundred ms.

As shown in FIG. 27, the ECUs 56 read the output signal Sig at different times. In order to eliminate adverse effects of chattering, the ECUs 56 read the output signal Sig when the signal has the same level (high or low) in two control periods.

For example, a first ECU detects that the IGSW 64 is turned off at time t2, however, the first ECU does not immediately recognize that the IGSW 64 has been turned off, but rather, first recognizes that the IGSW 64 has been turned off only upon detecting that the IGSW 64 is turned off at time t2 and at time t4. On the other hand, a second ECU detects that the IGSW 64 is turned off at time t3, but detects that the IGSW 64 is turned on at time t6. Thus, since the second ECU does not detect twice in succession that the IGSW 64 is turned off, the second ECU recognizes that the IGSW 64 remains turned on.

In the above situation, according to the present embodiment, in order to rewrite the program, after the IGSW 64 is turned to the "OFF" position whereupon the ECU 56 is turned off, the IGSW 64 must be returned to the "ON" position. An instruction for prompting the user to return the IGSW 64 to the "ON" position is displayed after it is detected that the ECU 56 has been turned off in response to the IGSW 64 being turned to the "OFF" position. Consequently, the ECU 56 can be reliably turned off before the program is rewritten.

Therefore, while the ECU 56 continuously performs the processing sequence, the program is prevented from being rewritten.

According to the present embodiment, if the IGSW 64 is erroneously turned to the "OFF" position while the program is being rewritten, then the program cannot be rewritten. At this time, an instruction for prompting the user to return the IGSW 64 to the "ON" position is displayed on the display unit 74. Therefore, it is possible to indicate the erroneous action to the user (vehicle occupant), and to prompt the user to return the IGSW 64 to its proper state. Therefore, at times when the user is in the vehicle 16 as well, the program can be rewritten, and the program can be rewritten more appropriately.

According to the present embodiment, if the rewriting device detects that the user has left the vehicle 16 while an instruction for prompting the user to return the IGSW 64 to the "ON" position is being displayed on the display unit 74, then a startup reservation is recorded as information concerning interruption of program rewriting, and a cancellation request signal for requesting that the receiving device 52 not be kept on is output to the receiving device 52.

Consequently, if the user mistakenly leaves the vehicle 16 with the IGSW 64 being turned to the "OFF" position while the program is being rewritten, it is possible to keep information concerning interruption of program rewriting. Therefore, the program can be rewritten again using the information that was kept. If the receiving device 52 is no longer turned on, the instruction stops being displayed on the display unit 74. Accordingly, the display unit 74 can avoid unwanted consumption of electric power.

According to the present embodiment, based on the output signal Sh from the detecting unit 66, the rewriting device 54 detects when the user leaves the vehicle 16. Using the output signal Sh, it is possible to determine easily if the user has left the vehicle 16.

According to the present embodiment, when the rewriting device 54 detects that the user has left the vehicle 16, the rewriting device 54 confirms whether or not a startup reservation has been recorded. If a startup reservation has been recorded, then the rewriting device 54 displays on the display unit 74 an instruction for prompting the user to turn the IGSW 64 to the "ON" position. Thus, in the event of an interruption during rewriting of the program, appropriate information can be displayed for resuming program rewriting.

According to the present embodiment, the rewriting device 54 detects when the user reenters the vehicle 16 based on the output signal Sh from the detecting unit 66. Using the output signal Sh, it is possible to determine easily when the user enters the vehicle 16.

B. Applications of the Present Invention

The present invention is not limited to the above embodiment, but may adopt various alternative arrangements based on the present disclosure. For example, the present invention may adopt any of the following arrangements.

1. Program Rewriting System 10:

In the above embodiment, the system 10 is used in combination with multiple vehicles. However, the system 10 may be used in combination with other mobile objects (aircrafts, ships, helicopters, etc.), which require electric power when restarted.

2. Data Transmission System 12:

In the above embodiment, rewriting data (program) are transmitted using the CD-ROM 22, the satellite broadcasting network 24, and the mobile communications network 26. However, rewriting data (program) may be transmitted using one or two of the CD-ROM 22, the satellite broadcasting network 24, and the mobile communications network 26. Alternatively, rewriting data (program) may be transmitted according to other methods, for example, wireless communications that do not use broadcasting satellites or portable telephones (e.g., wireless communications by way of light beacons installed along roadsides). The CD-ROM 22 may be replaced with another storage medium (DVD-ROM, flash memory, or the like).

3. Vehicle 16:

In the above embodiment, the vehicles 16 are gasoline-powered vehicles. However, the vehicles 16 may be different types of vehicles, for example, electric vehicles (including hybrid vehicles and fuel cell vehicles) having a drive source that requires electric power when restarted.

4. ECUs 56:

In the above embodiments, the ECUs 56 include the ENG ECU 56a, the ABS ECU 56b, the SRS ECU 56c, and the immobilizer ECU 56d. However, the quantity and types of ECUs 56 are not limited to those illustrated above.

5. IGSW 64:

In the above embodiment, the IGSW 64 comprises a rotary switch. However, if the vehicle 16 includes a so-called smart start function, then the IGSW 64 may comprise a push switch, which cycles successively through the "OFF", "ACCESSORY", and "ON" positions when pushed.

6. Judgment of Restartability:

(1) Estimation of State of Battery 58 after Program is Rewritten:

In the above embodiment, the SOC, the battery current Ibat, and the expected processing time Tre are used to estimate the state of the battery 58 after the program is rewritten (refer to the above inequality (1)). However, other data may be used insofar as such data make it possible to estimate the state of the battery 58 after the program is rewritten. For example, the state of the battery 58 after the program is rewritten may be estimated based on an amount of electric power $\Delta AH1$ [A·h] that has been discharged up to the present time from the battery 58 from a given charged state, and an expected amount of electric power $\Delta AH2$ [A·h] that will be discharged from the battery 58 from the present time until after the program is rewritten. The given charged state may be set to an appropriate value, such as a fully charged state, an SOC of 80%, an SOC of 75%, or the like.

More specifically, it is judged whether or not the following inequality (2) is satisfied:

$$\Delta AH1 + \Delta AH2 < TH\_\Delta AH \quad (2)$$

where $TH\_\Delta AH$ represents a threshold value (maximum value) for an amount of electric power that is discharged from the given charged state, and which makes it possible to start the vehicle 16. The threshold value $TH\_\Delta AH$ is a measured value or a simulated value, which is included in the rewriting data (program). The expected amount of electric power $\Delta AH2$ is calculated as a product of the battery current Ibat at the present time and the expected processing time Tre required for the program to be rewritten.

According to the above judging process, the state of the battery 58 after the program is rewritten can simply be predicted and used.

Alternatively, the state of the battery 58 after the program is rewritten can be predicted according to the method disclosed in JP2008-155892A.

(2) Conditions that Make it Impossible to Rewrite the Program:

According to the above embodiment, a condition that makes it impossible to rewrite the program is that the battery 58 is capable of restarting the vehicle 16 after the program is rewritten in step S31 of FIG. 7. Furthermore, step S46 of FIG. 9 uses the condition (i) that the engine rotational speed Ne is 0 [rpm], the condition (ii) that the vehicle speed V is 0 [km/h], the condition (iii) that the gearshift position is the position P (Parking), the condition (iv) that the target ECU 56*tar* is at or below the threshold value THe, and the condition (v) that the immobilizer ECU 56*d* determines that a proper key has been inserted.

However, other conditions may be used for making it impossible to rewrite the program. For example, it may be impossible to rewrite the program if the battery current Ibat at the time that rewriting of the program is started is greater than a threshold value THi [A]. The threshold value THi may be set to a current value representing a high undesirable electric load at the time that the program is rewritten.

It may also be impossible to rewrite the program if the internal resistance R of the battery 58 at the time that the program is rewritten is greater than a threshold value THr [$\Omega$]. The threshold value Thr, which serves to determine that the battery 58 has become excessively deteriorated, may be a measured value or a simulated value.

Figure 28:
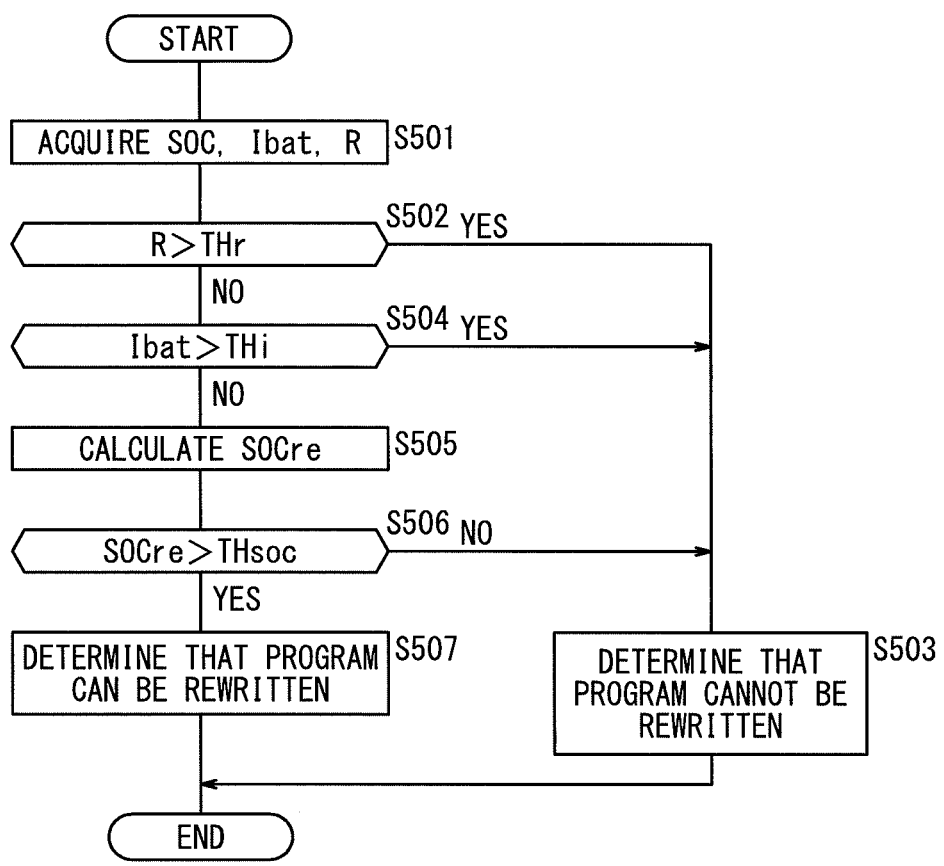
FIG. 28 is a flowchart of a sequence for judging whether or not a program can be rewritten using the internal resistance of a battery and a current threshold value.

FIG. 28 is a flowchart of a sequence for judging whether or not the program can be rewritten using the threshold values THi, THr in addition to the inequality (1). The flowchart of FIG. 28 may be used in step S31 of FIG. 7.

In step S501, the rewriting device 54 acquires an SOC, a battery current Ibat, and an internal resistance R at present, which are supplied from the ENG ECU 56*a* or the battery sensor 60.

In step S502, the rewriting device 54 judges whether or not the internal resistance R is greater than the threshold value THr. If the internal resistance R is greater than the threshold value THr (step S502: YES), then in step S503, the rewriting device 54 decides that the program cannot be rewritten, since there is a possibility that the vehicle 16 cannot be restarted after the program has been rewritten. If the internal resistance R is equal to or smaller than the threshold value THr (step S502: NO), then control proceeds to step S504.

In step S504, the rewriting device 54 judges whether or not the battery current Ibat is greater than the threshold value THi. If the battery current Ibat is greater than the threshold value THi (step S504: YES), then in step S503, the rewriting device 54 decides that the program cannot be rewritten as a result of a high undesirable electric load. If the battery current Ibat is equal to or smaller than the threshold value THi (step S504: NO), then control proceeds to step S505.

In step S505, the rewriting device 54 calculates a predicted value SOCre [%] of the SOC after the program is rewritten. The predicted value SOCre is equal to SOC$-$(Ibat$\times$Tre$\times$K), which appears in the above inequality (1).

In step S506, the rewriting device 54 judges whether or not the predicted value SOCre is greater than the threshold value THsoc. If the predicted value SOCre is equal to or smaller than the threshold value THsoc (step S506: NO), then in step S503, the rewriting device 54 decides that the program cannot be rewritten. If the predicted value SOCre is greater than the threshold value THsoc (step S506: YES), then in step S507, the rewriting device 54 determines that the program can be rewritten.

Generally, the internal resistance R reflects a state of deterioration of the battery 58. Therefore, if the internal resistance R is greater than the threshold value THr, then it is difficult to accurately predict the charged state of the battery 58 after the program is rewritten. If the battery current Ibat is large, it also is difficult to accurately predict the charged state of the battery 58 after the program is rewritten. According to the flowchart of FIG. 28, even though the predicted value SOCre is greater than the threshold value THsoc, the rewriting device 54 stops rewriting the program if the internal resistance R at the time that rewriting of the program is started is greater than the threshold value THr, or if the battery current Ibat is greater than the threshold value THi. Consequently, if the accuracy of the prediction is low, the rewriting device 54 stops rewriting the program, thereby lowering the possibility that the vehicle 16 cannot be restarted.

The judging process, which uses the above inequality (2), may be performed instead of steps S505 and S506 of FIG. 28.

7. Judgment of Turning-Off of ECUs 56:

In the above embodiment, the rewriting device 54 reads the position to which the IGSW 64 has been turned or sends a response request to an ECU 56, and the rewriting device 54 detects that the ECU 56 has been turned off in the absence of a response from the ECU 56. However, other processes may be used to detect when the ECU 56 is turned off. For example, the rewriting device 54 may request a program ID, and may detect when the ECU 56 is turned off based on whether or not a response is received from the ECU 56. Alternatively, the rewriting device 54 may read the position to which the IGSW 64 has been turned, and may regard the ECU 56 as having been turned off after a predetermined period has elapsed from when the position "OFF" of the IGSW 64 was detected, or alternatively, may regard the ECU 56 as having been turned off in the absence of a response from the ECU 56 to a response request that has been sent.

8. Detection of When User Leaves the Vehicle or Reenters the Vehicle:

In the above embodiment, the user leaving the vehicle or reentry of the user into the vehicle is detected based on the output signal from the door lock/vehicle occupant detecting unit 66, i.e., the unlocked/locked state of the door lock 122 and the pressure on the seat. However, either one of the unlocked/locked state of the door lock 122 and the pressure on the seat may be used to detect when the user leaves the vehicle or reenters the vehicle. Moreover, another scheme (e.g., a load sensor installed in the seat or an infrared sensor for detecting infrared rays in the vicinity of the driver's seat) may be used to detect when the user leaves the vehicle or reenters the vehicle (whether the vehicle occupant is present in the vehicle 16).

The invention claimed is:

1. A vehicular program rewriting system comprising:
   an electronic control unit including a storage unit that stores a program therein and which is capable of rewriting the program;
   a rewriting device for rewriting the program; and
   a battery for supplying electric power in order to operate a drive source of a vehicle and the electronic control unit,
   wherein the rewriting device is configured to predict a state of the battery after the program is rewritten, by using a state of the battery when the program starts to be rewritten and an expected processing time for rewriting the program, and
   the rewriting device is configured to determine if the predicted state of the battery satisfies a condition of restarting the vehicle, and if so, rewrite the program,
   wherein the rewriting device is configured to determine if a current consumed by the battery or an internal resistance of the battery when the program starts to be rewritten is greater than a predetermined value, and if so, stop rewriting the program even thought the predicted state of the battery satisfies the condition for restarting the vehicle.

2. The vehicular program rewriting system according to claim 1, wherein the rewriting device is configured to change the condition for restarting the vehicle depending on at least one of an ambient temperature in the vicinity of the vehicle, an engine coolant water temperature of the vehicle, and an internal resistance of the battery.

3. The vehicular program rewriting system according to claim 1, wherein the rewriting device is configured to:
   predict a remaining stored energy level or charged ratio of the battery after the program is rewritten, by using the remaining stored energy level or charged ratio and a consumed current of the battery when the program starts to be rewritten and the expected processing time for rewriting the program; and
   determine if the predicted remaining stored energy level or charged ration is greater than a predetermined value, and if so, rewrite the program.

4. The vehicular program rewriting system according to claim 1, wherein the rewriting device is configured to:
   predict an amount of electric power discharged from the battery from a predetermined charged state thereof until after the program is rewritten, by using the amount of electric power discharged from the battery from the predetermined charged state thereof until the program starts to be rewritten, a current consumed by the battery when the program starts to be rewritten, and the expected processing time for rewriting the program; and
   determine if the predicted amount of electric power discharged from the battery is smaller than a predetermined value, and if so, rewrite the program.

5. A program rewriting method for a vehicle, the vehicle comprising
   an electronic control unit including a storage unit that stores a program therein and which is capable of rewriting the program; and
   a battery for supplying electric power in order to operate a drive source of the vehicle and the electronic control unit,
   wherein the method comprising:
   predicting, using the electronic control unit, a state of the battery after the program is rewritten, by using a state of the battery when the program starts to be rewritten and an expected processing tome for rewriting the program,
   determining, using the electronic control unit, if the predicted state of the battery satisfies a condition for restarting the vehicle, and if so, rewriting the program, and
   determining, using the electronic control unit, if a current consumed by the battery or an internal resistance of the battery when the program starts to be rewritten is greater than a predetermined value, and if so, stopping rewriting the program even though the predicted state of the battery satisfies the condition for restarting the vehicle.

* * * * *